United States Patent
Gotschall et al.

(10) Patent No.: US 12,411,018 B2
(45) Date of Patent: Sep. 9, 2025

(54) SYSTEM FOR TRACKING AND MANAGEMENT OF EMS RESPONSES

(71) Applicant: ZOLL MEDICAL CORPORATION, Chelmsford, MA (US)

(72) Inventors: Robert H. Gotschall, Thornton, CO (US); Michael S. Erlich, Erie, CO (US); James Seymour McElroy, Jr., Boulder, CO (US)

(73) Assignee: ZOLL MEDICAL CORPORATION, Chelmsford, MA (US)

( * ) Notice: Subject to any disclaimer, the term of this patent is extended or adjusted under 35 U.S.C. 154(b) by 136 days.

(21) Appl. No.: 18/118,408

(22) Filed: Mar. 7, 2023

(65) Prior Publication Data

US 2023/0314159 A1 Oct. 5, 2023

Related U.S. Application Data

(63) Continuation of application No. 17/152,133, filed on Jan. 19, 2021, now Pat. No. 11,635,300, which is a continuation of application No. 16/786,203, filed on Feb. 10, 2020, now Pat. No. 10,942,040, which is a continuation of application No. 13/467,859, filed on May 9, 2012, now Pat. No. 10,598,508.

(60) Provisional application No. 61/484,121, filed on May 9, 2011.

(51) Int. Cl.
*G01C 21/36* (2006.01)

(52) U.S. Cl.
CPC ................ *G01C 21/3664* (2013.01)

(58) Field of Classification Search
CPC ....................................................... G06F 16/29
See application file for complete search history.

(56) References Cited

U.S. PATENT DOCUMENTS

| | | |
|---|---|---|
| 5,085,224 A | 2/1992 | Galen et al. |
| 5,224,485 A | 7/1993 | Powers et al. |
| 5,319,363 A | 6/1994 | Welch et al. |

(Continued)

FOREIGN PATENT DOCUMENTS

| | | |
|---|---|---|
| WO | 2006086089 | 8/2006 |
| WO | 2011011454 | 1/2011 |

OTHER PUBLICATIONS

ZOLL Data Systems, "RescueNet Navigator Brochure," 2008, 2 pages (Previously submitted in related U.S. Appl. No. 16/786,203).

(Continued)

*Primary Examiner* — Di Xiao
(74) *Attorney, Agent, or Firm* — Finch & Maloney PLLC

(57) ABSTRACT

A system for tracking and management of emergency medical services (EMS) responses includes one or more servers configured to assign two or more EMS responses of a plurality of EMS responses corresponding to a plurality of incidences to an EMS vehicle, wherein a first EMS response of the two or more EMS responses is an emergency patient transport and another EMS response of the two or more EMS responses is a pre-scheduled patient transport, provide a user interface comprising a map comprising location information for the two or more EMS responses, receive location information updates for the EMS vehicle, update the map and a status of the EMS vehicle at the user interface based on the location information updates, and store a status history for the EMS vehicle.

21 Claims, 25 Drawing Sheets

(56) References Cited

U.S. PATENT DOCUMENTS

| | | |
|---|---|---|
| 5,333,617 A | 8/1994 | Hafner |
| 5,494,051 A | 2/1996 | Schneider, Sr. |
| 5,511,553 A | 4/1996 | Segalowitz |
| 5,544,661 A | 8/1996 | Davis et al. |
| 5,549,659 A | 8/1996 | Johansen et al. |
| 5,586,024 A | 12/1996 | Shaibani |
| 5,593,426 A | 1/1997 | Morgan et al. |
| 5,782,878 A | 7/1998 | Morgan et al. |
| 6,117,073 A | 9/2000 | Jones et al. |
| 6,141,584 A | 10/2000 | Rockwell et al. |
| 6,321,113 B1 | 11/2001 | Parker et al. |
| 6,390,996 B1 | 5/2002 | Halperin et al. |
| 6,398,744 B2 | 6/2002 | Bystrom et al. |
| 6,405,083 B1 | 6/2002 | Rockwell et al. |
| 6,405,238 B1 | 6/2002 | Votipka |
| 6,481,887 B1 | 11/2002 | Mirabella |
| 6,532,381 B2 | 3/2003 | Bayer et al. |
| 6,604,115 B1 | 8/2003 | Gary, Jr. et al. |
| 6,681,003 B2 | 1/2004 | Linder et al. |
| 6,727,814 B2 | 4/2004 | Saltzstein et al. |
| 6,747,556 B2 | 6/2004 | Medema et al. |
| 6,827,695 B2 | 12/2004 | Palazzolo et al. |
| 6,829,501 B2 | 12/2004 | Nielsen et al. |
| 6,937,150 B2 | 8/2005 | Medema et al. |
| 6,957,102 B2 | 10/2005 | Silver et al. |
| 6,993,386 B2 | 1/2006 | Lin et al. |
| 7,006,865 B1 | 2/2006 | Cohen et al. |
| 7,118,542 B2 | 10/2006 | Palazzolo et al. |
| 7,120,488 B2 | 10/2006 | Nova et al. |
| 7,122,014 B2 | 10/2006 | Palazzolo et al. |
| 7,129,836 B2 | 10/2006 | Lawson et al. |
| 7,162,306 B2 | 1/2007 | Caby et al. |
| 7,231,258 B2 | 6/2007 | Moore et al. |
| 7,233,905 B1 | 6/2007 | Hutton et al. |
| 7,295,871 B2 | 11/2007 | Halperin et al. |
| 7,412,395 B2 | 8/2008 | Rowlandson |
| 7,444,315 B2 | 10/2008 | Wu |
| 7,650,291 B2 | 1/2010 | Rosenfeld et al. |
| 8,314,683 B2 | 11/2012 | Pfeffer |
| 8,375,402 B2 | 2/2013 | Majewski et al. |
| 8,566,923 B2 | 10/2013 | Fredette et al. |
| 10,598,508 B2 | 3/2020 | Gotschall et al. |
| 10,942,040 B2 | 3/2021 | Gotschall et al. |
| 2001/0044732 A1 | 11/2001 | Maus et al. |
| 2002/0004729 A1 | 1/2002 | Zak et al. |
| 2004/0077995 A1 | 4/2004 | Ferek-Petric et al. |
| 2004/0119683 A1 | 6/2004 | Warn et al. |
| 2005/0131740 A1* | 6/2005 | Massenzio ............ G06Q 10/10 |
| | | 705/2 |
| 2005/0277872 A1 | 12/2005 | Colby et al. |
| 2006/0009809 A1 | 1/2006 | Marcovecchio et al. |
| 2006/0149597 A1 | 7/2006 | Powell et al. |
| 2006/0229802 A1 | 10/2006 | Vertelney et al. |
| 2006/0287586 A1 | 12/2006 | Murphy |
| 2007/0021125 A1 | 1/2007 | Zhu et al. |
| 2007/0100213 A1 | 5/2007 | Dossas et al. |
| 2007/0118038 A1 | 5/2007 | Bodecker et al. |
| 2007/0138347 A1 | 6/2007 | Ehlers |
| 2007/0203742 A1 | 8/2007 | Jones et al. |
| 2007/0255120 A1 | 11/2007 | Rosnov |
| 2007/0265772 A1 | 11/2007 | Geelen |
| 2007/0276300 A1 | 11/2007 | Olson et al. |
| 2007/0299689 A1 | 12/2007 | Jones et al. |
| 2008/0018454 A1 | 1/2008 | Chan et al. |
| 2008/0126134 A1 | 5/2008 | Jones et al. |
| 2008/0278311 A1 | 11/2008 | Grange et al. |
| 2009/0063187 A1 | 3/2009 | Johnson et al. |
| 2009/0177981 A1 | 7/2009 | Christie et al. |
| 2009/0222539 A1 | 9/2009 | Lewis et al. |
| 2009/0254272 A1* | 10/2009 | Hendrey ............ G01C 21/3415 |
| | | 701/414 |
| 2009/0281850 A1 | 11/2009 | Bruce et al. |
| 2009/0284348 A1 | 11/2009 | Pfeffer |
| 2009/0303531 A1 | 12/2009 | Abe |
| 2010/0020033 A1 | 1/2010 | Nwosu et al. |
| 2010/0159967 A1* | 6/2010 | Pounds ................... H04L 67/55 |
| | | 709/206 |
| 2010/0184453 A1 | 7/2010 | Ohki |
| 2010/0192085 A1* | 7/2010 | Yamazaki ............. G06F 3/0481 |
| | | 715/773 |
| 2010/0281052 A1 | 11/2010 | Geelen |
| 2010/0298899 A1 | 11/2010 | Donnelly et al. |
| 2010/0312462 A1 | 12/2010 | Gueziec et al. |
| 2011/0010087 A1 | 1/2011 | Wons et al. |
| 2011/0063301 A1 | 3/2011 | Setlur et al. |
| 2011/0117878 A1* | 5/2011 | Barash ................... G16H 40/20 |
| | | 340/539.12 |
| 2011/0161852 A1 | 6/2011 | Vainio et al. |
| 2011/0172550 A1 | 7/2011 | Martin et al. |
| 2011/0175930 A1 | 7/2011 | Hwang et al. |
| 2011/0246220 A1* | 10/2011 | Albert ................... G06Q 10/00 |
| | | 705/2 |
| 2011/0288763 A1* | 11/2011 | Hui .................... G01C 21/3635 |
| | | 701/533 |
| 2011/0295078 A1 | 12/2011 | Reid et al. |
| 2012/0198547 A1 | 8/2012 | Fredette et al. |
| 2013/0124090 A1 | 5/2013 | Gotschall et al. |
| 2013/0253831 A1 | 9/2013 | Langendorff |
| 2021/0239489 A1 | 8/2021 | Gotschall et al. |

OTHER PUBLICATIONS

International Search Report and Written Opinion dated Oct. 9, 2012 from International Application No. PCT/US2012/037148 (Previously submitted in related U.S. Appl. No. 16/786,203).

Chu, et al., "A Mobile Teletrauma System Using 3G Networks, " IEEE Transactions on Information Technology in Biomedicine, vol. 9, No. 4, Dec. 2004 (Previously submitted in related U.S. Appl. No. 16/786,203).

Correspondence from Barry Chapin to Benjamin Fernandez dated Jan. 7, 2013 (Previously submitted in related U.S. Appl. No. 16/786,203).

Mandel, T. Resuscitating the User Experience: A Touchscreen System for EMS and Fire Rescue Professionals, User Experience Magazine, vol. 6, Issue 4, 2007 (Previously submitted in related U.S. Appl. No. 16/786,203).

Pahlavan, K. et al., An Overview of Wireless Indoor Geolocation Techniques and Systems, C.G. Omidyar (Ed.): MWCN 2000, LNCS 1818, pp. 1-13, Springer-Verlag Berlin Heidelberg 2000 (Previously submitted in related U.S. Appl. No. 16/786,203).

Poor, R., "Wireless Mesh Networks," Sensors, Feb. 1, 2003, Retrieved from the Internet at http://www.sensorsmag.com/networking-communications/standards-protocols/wireless-mesh-networks-968 (Previously submitted in related U.S. Appl. No. 16/786,203).

Zoorob, R. et al., "Acute Dyspnea in the Office," American Family Physician, Nov. 1, 2003, Retrieved from the Internet at http://www.aafp.org/afp/2003/1101/p1803.html?printable=afp (Previously submitted in related U.S. Appl. No. 16/786,203).

Non-Final Office Action mailed in U.S. Appl. No. 17/152,133 dated Jul. 9, 2020. (Previously submitted in related U.S. Appl. No. 17/152,133).

Notice of Allowance mailed in U.S. Appl. No. 17/152,133 dated Oct. 19, 2020. (Previously submitted in related U.S. Appl. No. 17/152,133).

* cited by examiner

Incident Summary

Incident Number    1
Nature             Heat / Cold Exposure
Call Type          Pre-Scheduled
Pro QA Determinant 06E01
Map Page Thurber Kent B
1300 SW 5th Ave
Portland, OR 97201
(503) 241-2300

Emergency

FIG. 16

SYSTEM FOR TRACKING AND MANAGEMENT OF EMS RESPONSES

CROSS-REFERENCE TO RELATED APPLICATIONS

This application claims benefit under 35 U.S.C. § 120 as a continuation of U.S. Non-Provisional patent application Ser. No. 17/152,133, filed Jan. 19, 2021, which claims benefit under 35 U.S.C. § 120 as a continuation of U.S. Non-Provisional patent application Ser. No. 16/786,203, filed Feb. 10, 2020 (now U.S. Pat. No. 10,942,040), which claims benefit under 35 U.S.C. § 120 as a continuation of U.S. Non-Provisional patent application Ser. No. 13/467,859, filed May 9, 2012 (now U.S. Pat. No. 10,598,508), which claims priority under 35 U.S.C. § 119(e) to U.S. Provisional Patent Application Ser. No. 61/484,121, filed on May 9, 2011, each of which is hereby incorporated by reference herein in its entirety.

TECHNICAL FIELD

Embodiments of the present invention relate generally to user interface systems, and more particularly to user interface systems for emergency medical services (EMS) navigation systems.

BACKGROUND

Current user interface systems for EMS devices typically include rather small navigation buttons spread out in various locations on the user's screen. For workers in the EMS field, particularly workers who interact with patients in a mobile environment, such complicated user interface setups with small buttons often require the workers to devote larger amounts of time to finding the correct button, and/or often divert the workers' attention or vision from the EMS situation (e.g. patient care or driving conditions) to focus on navigating the user interface. For example, an ambulance driver who is using an EMS navigation system may need to stop the vehicle in order to divert the necessary attention to activating navigation commands in an EMS navigation device. EMS navigation interfaces which include small buttons spread out in various locations on the user's screen detract the EMS technician's attention from other more valuable targets during an EMS response event.

SUMMARY

A method for interfacing with a user of an EMS navigation system according to embodiments of the present invention includes displaying on a device screen a series of display screens that are navigationally linked by a series of navigation buttons, wherein the series of display screens comprises a home screen, wherein each display screen of the series of display screens comprises a home button linking to the home screen, wherein each navigation button of the series of navigation buttons appearing in a display screen of the series of display screens is substantially the same size and larger than other buttons in the display screen, and wherein each navigation button of the series of navigation buttons appearing in the display screen of the series of display screens is adjacent to a left edge or a right edge of the device screen to facilitate use by EMS users.

A method for interfacing with a user of an EMS navigation system according to embodiments of the present invention includes displaying on a device screen a series of display screens that are navigationally linked by a series of navigation buttons, wherein the series of display screens comprises a home screen, wherein each display screen of the series of display screens comprises a home button linking to the home screen, wherein each navigation button of the series of navigation buttons appearing in a display screen of the series of display screens is larger than any other buttons in the display screen, and wherein each navigation button of the series of navigation buttons appearing on the display screen of the series of display screens is adjacent to a left edge or a right edge of the device screen. A user may toggle or cycle through two or more of the series of display screens by selecting a toggle button which has a same position on the device screen in each of the two or more of the series of display screens.

A method for interfacing with a user of an EMS navigation system according to embodiments of the present invention includes receiving an incident assignment from a dispatcher corresponding to an EMS incident, displaying an easy response button with a device touchscreen, wherein the easy response button has an area substantially as large as the device touchscreen, detecting a user's touch on the easy response button on the device touchscreen, and based on the detection of the user's touch, updating a status of the EMS navigation system to indicate that response is being made.

The method as described above, further including, based on the detection of the user's touch, automatically displaying a map with a route to a target destination corresponding to the EMS incident.

The methods as described above, wherein updating a status of the EMS navigation system to indicate that response is being made includes starting a response timer.

The methods as described above, wherein displaying the easy response button includes displaying a timer indicating a time since the incident assignment was received from the dispatcher.

The methods as described above, wherein displaying the easy response button includes displaying a nature of the EMS incident.

The methods as described above, wherein displaying the easy response button includes displaying a location of the EMS incident.

A system for EMS navigation according to embodiments of the present invention includes a touch screen display device, the touch screen display device configured to display information related to EMS navigation and to accept tactile input from a user, the touch screen configured to display a series of display screens that are navigationally linked by a series of navigation buttons, wherein the series of display screens comprises a home screen, wherein each display screen of the series of display screens comprises a home button linking to the home screen, wherein each navigation button of the series of navigation buttons appearing in a display screen of the series of display screens is larger than any other buttons on the display screen, and wherein each navigation button of the series of navigation buttons appearing in the display screen of the series of display screens is adjacent to a left edge or a right edge of the device screen.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 7 illustrates a first dispatch screen of an EMS navigation system, according to embodiments of the present invention.

FIG. 8 illustrates a second dispatch screen of an EMS navigation system, according to embodiments of the present invention.

FIG. 16 illustrates a work selection screen of an EMS navigation system, according to embodiments of the present invention.

Figure 1:
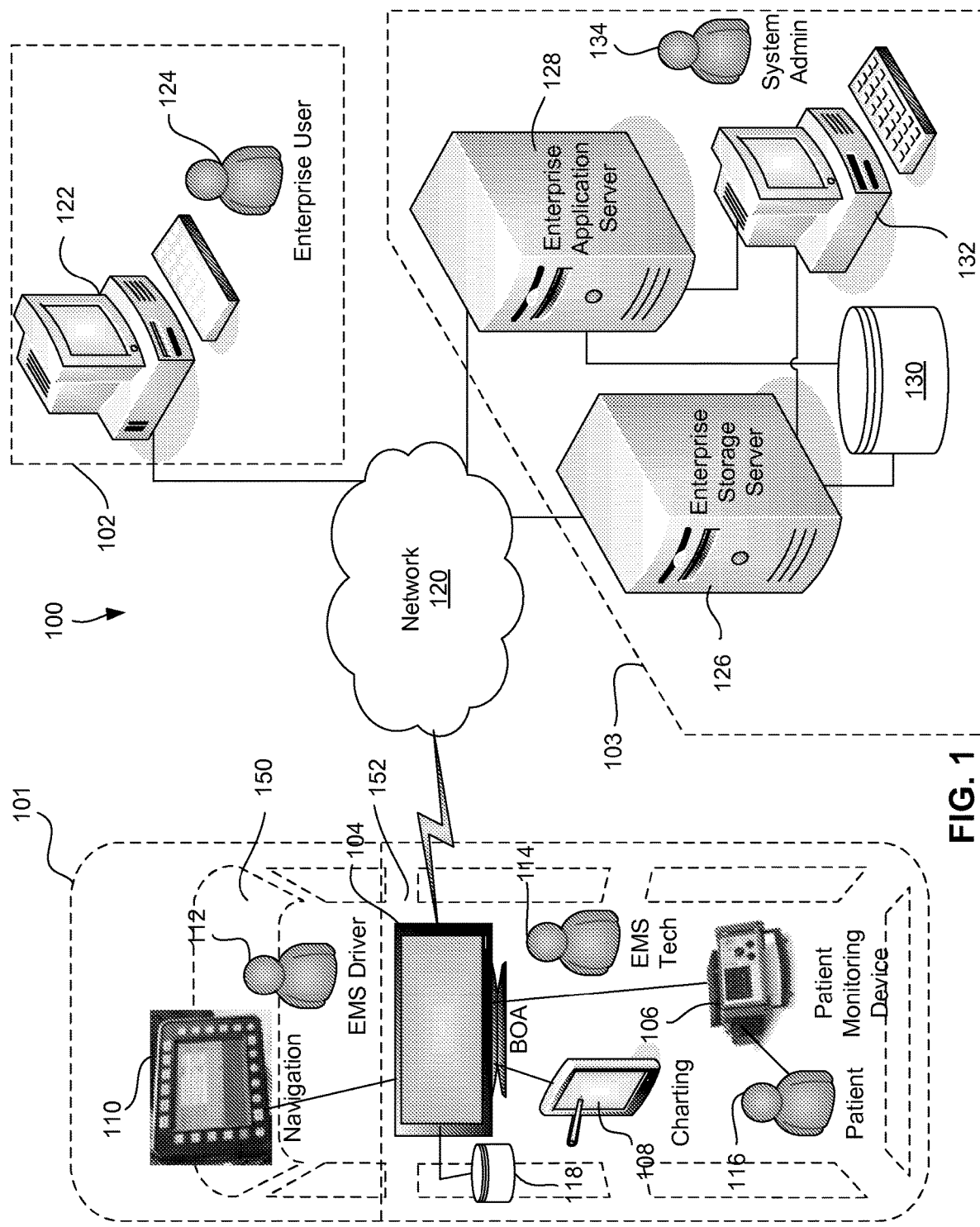
FIG. 1 illustrates a system for mobile and enterprise user real-time display of medical information collected from multiple different EMS devices, according to embodiments of the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

As illustrated in FIG. 1, a system 100 according to embodiments of the present invention performs advanced data management, integration and presentation of EMS data from multiple different devices. System 100 includes a mobile environment 101, an enterprise environment 102, and an administration environment 103. Devices within the various environments 101, 102, 103 may be communicably coupled via a network 120, such as, for example, the Internet. System 100 is further described in Patent Cooperation Treaty Application Publication No. WO 2011/011454, published on Jan. 27, 2011, which is incorporated herein by reference in its entirety for all purposes.

As used herein, the phrase "communicably coupled" is used in its broadest sense to refer to any coupling whereby information may be passed. Thus, for example, communicably coupled includes electrically coupled by, for example, a wire; optically coupled by, for example, an optical cable; and/or wirelessly coupled by, for example, a radio frequency or other transmission media. "Communicably coupled" also includes, for example, indirect coupling, such as through a network, or direct coupling.

According to embodiments of the present invention, the mobile environment 101 is an ambulance or other EMS vehicle—for example a vehicular mobile environment (VME). The mobile environment may also be the local network of data entry devices as well as diagnostic and therapeutic devices established at time of treatment of a patient or patients in the field environment—the "At Scene Patient Mobile Environment" (ASPME). The mobile environment may also be a combination of one or more of VMEs and/or ASPMEs. The mobile environment may include a navigation device 110 used by the driver 112 to track the mobile environment's position 101, locate the mobile environment 101 and/or the emergency location, and locate the transport destination, according to embodiments of the present invention. The navigation device 110 may include a Global Positioning System ("GPS"), for example. The navigation device 110 may also be configured to perform calculations about vehicle speed, the travel time between locations, and estimated times of arrival. According to embodiments of the present invention, the navigation device 110 is located at the front of the ambulance to assist the driver 112 in navigating the vehicle. The navigation device 110 may be, for example, a RescueNet® Navigator onboard electronic data communication system available from Zoll Data Systems of Broomfield, Colorado.

As illustrated in FIG. 1, a patient monitoring device 106 and a patient charting device 108 are also often used for patient care in the mobile environment 101, according to embodiments of the present invention. The EMS technician 114 attaches the patient monitoring device 106 to the patient 116 to monitor the patient 116. The patient monitoring device 106 may be, for example, a defibrillator device with electrodes and/or sensors configured for attachment to the patient 116 to monitor heart rate and/or to generate electrocardiographs ("ECG's"), according to embodiments of the present invention. The patient monitoring device 106 may also include sensors to detect or a processor to derive or calculate other patient conditions. For example, the patient monitoring device 106 may monitor, detect, treat and/or derive or calculate blood pressure, temperature, respiration rate, blood oxygen level, end-tidal carbon dioxide level, pulmonary function, blood glucose level, and/or weight, according to embodiments of the present invention. The patient monitoring device 106 may be a Zoll E-Series® defibrillator available from Zoll Medical Corporation of Chelmsford, Massachusetts, according to embodiments of the present invention. A patient monitoring device may also be a patient treatment device, or another kind of device that includes patient monitoring and/or patient treatment capabilities, according to embodiments of the present invention.

The patient charting device 108 is a device used by the EMS technician 114 to generate records and/or notes about the patient's 116 condition and/or treatments applied to the patient, according to embodiments of the present invention. For example, the patient charting device 108 may be used to note a dosage of medicine given to the patient 116 at a particular time. The patient charting device 108 and/or patient monitoring device 106 may have a clock, which may be synchronized with an external time source such as a network or a satellite to prevent the EMS technician from having to manually enter a time of treatment or observation (or having to attempt to estimate the time of treatment for charting purposes long after the treatment was administered), according to embodiments of the present invention. The patient charting device 108 may also be used to record biographic and/or demographic and/or historical information about a patient, for example the patient's name, identification number, height, weight, and/or medical history, according to embodiments of the present invention. According to embodiments of the present invention, the patient charting device 108 is a tablet PC, such as for example the TabletPCR component of the RescueNet® ePCR Suite available from Zoll Data Systems of Broomfield, Colorado. According to some embodiments of the present invention, the patient charting device 108 is a wristband or smartphone such as an Apple iPhone or iPad with interactive data entry interface such as a touch screen or voice recognition data entry that may be communicably connected to the BOA device 104 and tapped to indicate what was done with the patient 116 and when it was done.

The navigation device 110, the charting device 108, and the monitoring device 106 are each separately very useful to the EMS drivers 112 and technicians 114 before, during, and after the patient transport. A "back of ambulance" ("BOA") device 104 receives, organizes, stores, and displays data from each device 108, 110, 112 to further enhance the usefulness of each device 108, 110, 112 and to make it much easier for the EMS technician 114 to perform certain tasks that would normally require the EMS technician 114 to divert visual and manual attention to each device 108, 110, 112 separately, according to embodiments of the present invention. In other words, the BOA device centralizes and organizes information that would normally be de-centralized and disorganized, according to embodiments of the present invention.

The BOA device 104 is communicably coupled to the patient monitoring device 106, the patient charting device 108, and the navigation device 110, according to embodiments of the present invention. The BOA device 104 is also communicably coupled to a storage medium 118. The BOA device 104 may be a touch-screen, flat panel PC, and the storage medium 118 may be located within or external to the BOA device 104, according to embodiments of the present invention. The BOA device 104 may include a display template serving as a graphical user interface, which permits the user (e.g. EMS tech 114) to select different subsets and/or display modes of the information gathered from and/or sent to devices 106, 108, 110, according to embodiments of the present invention.

Some embodiments of the present invention include various steps, some of which may be performed by hardware components or may be embodied in machine-executable instructions. These machine-executable instructions may be used to cause a general-purpose or a special-purpose processor programmed with the instructions to perform the steps. Alternatively, the steps may be performed by a combination of hardware, software, and/or firmware. In addition, some embodiments of the present invention may be performed or implemented, at least in part (e.g., one or more modules), on one or more computer systems, mainframes (e.g., IBM mainframes such as the IBM zSeries, Unisys ClearPath Mainframes, HP Integrity NonStop servers, NEC Express series, and others), or client-server type systems. In addition, specific hardware aspects of embodiments of the present invention may incorporate one or more of these systems, or portions thereof.

Figure 2:
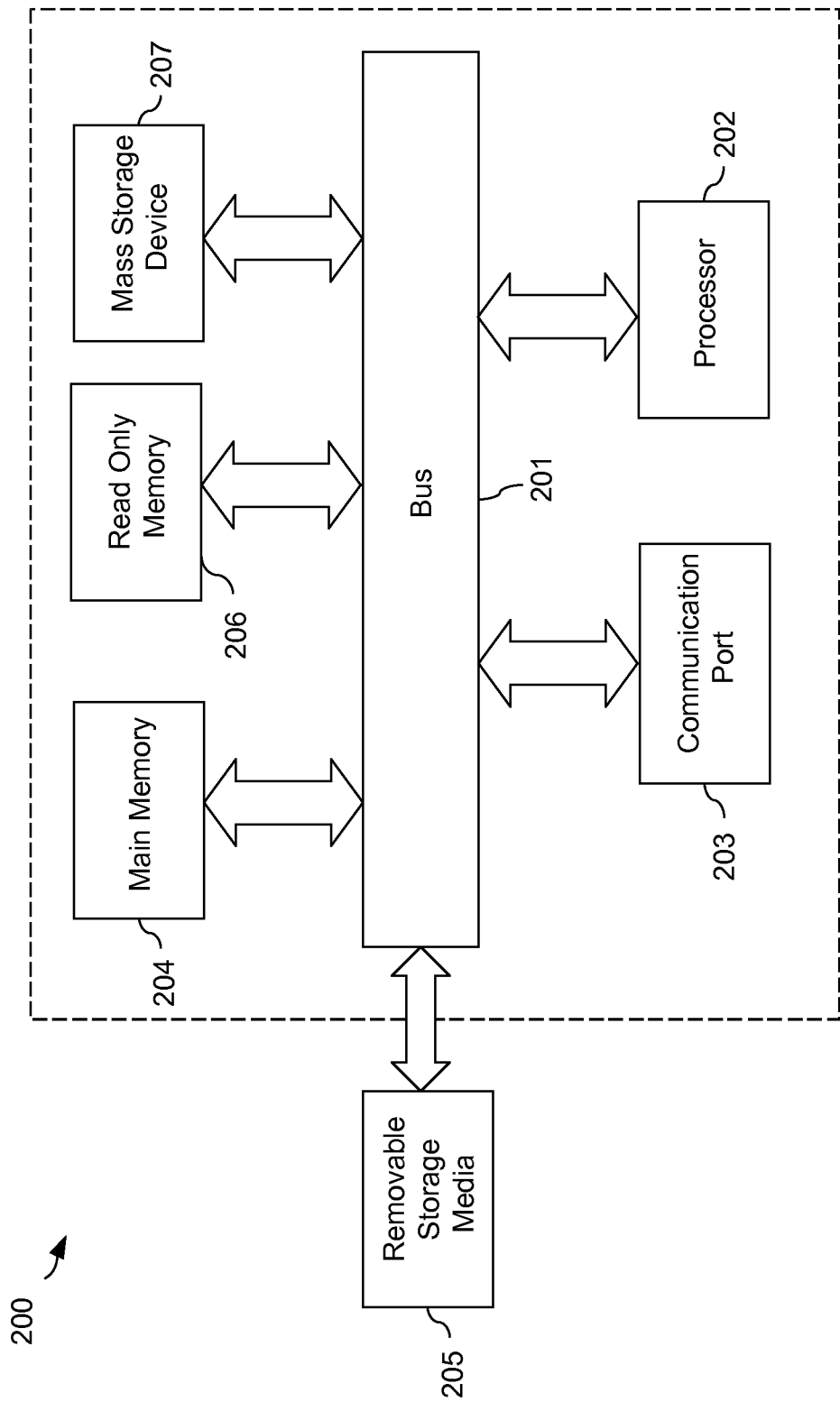
FIG. 2 illustrates an exemplary computer system, according to embodiments of the present invention.

As such, FIG. 2 is an example of a computer system 200 with which embodiments of the present invention may be utilized. According to the present example, the computer system includes a bus 201, at least one processor 202, at least one communication port 203, a main memory 204, a removable storage media 205, a read only memory 206, and a mass storage 207.

Processor(s) 202 can be any known processor, such as, but not limited to, an Intel® Itanium® or Itanium 2® processor(s), or AMD® Opteron® or Athlon MP® processor(s), or Motorola® lines of processors. Communication port(s) 203 can be any of an RS-232 port for use with a modem based dialup connection, a 10/100 Ethernet port, or a Gigabit port using copper or fiber, for example. Communication port(s) 203 may be chosen depending on a network such a Local Area Network (LAN), Wide Area Network (WAN), or any network to which the computer system 200 connects. Main memory 204 can be Random Access Memory (RAM), or any other dynamic storage device(s) commonly known to one of ordinary skill in the art. Read only memory 206 can be any static storage device(s) such as Programmable Read Only Memory (PROM) chips for storing static information such as instructions for processor 202, for example.

Mass storage 207 can be used to store information and instructions. For example, hard disks such as the Adaptec® family of SCSI drives, an optical disc, an array of disks such as RAID (e.g. the Adaptec family of RAID drives), or any other mass storage devices may be used, for example. Bus 201 communicably couples processor(s) 202 with the other memory, storage and communication blocks. Bus 201 can be a PCI/PCI-X or SCSI based system bus depending on the storage devices used, for example. Removable storage media 205 can be any kind of external hard-drives, floppy drives, IOMEGA® Zip Drives, Compact Disc-Read Only Memory (CD-ROM), Compact Disc-Re-Writable (CD-RW), or Digital Video Disk-Read Only Memory (DVD-ROM), for example. The components described above are meant to exemplify some types of possibilities. In no way should the aforementioned examples limit the scope of the invention, as they are only exemplary embodiments.

Figure 3:
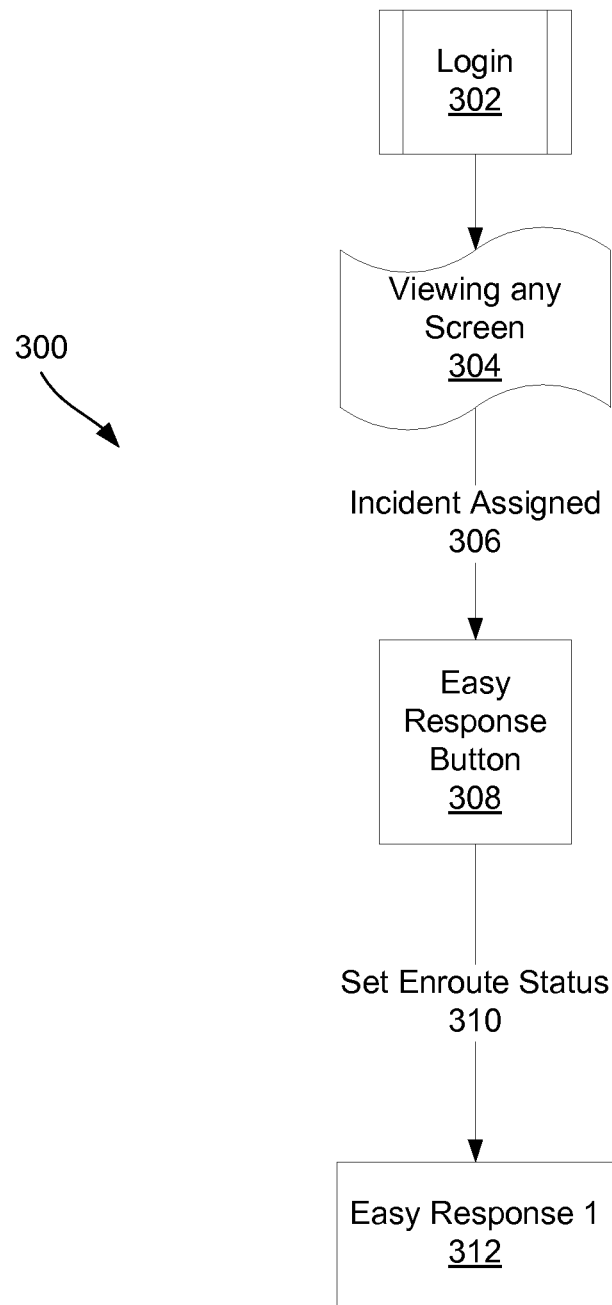
FIG. 3 depicts a flow diagram illustrating an activation of response status through use of an easy response button, according to embodiments of the present invention.
Figure 5:
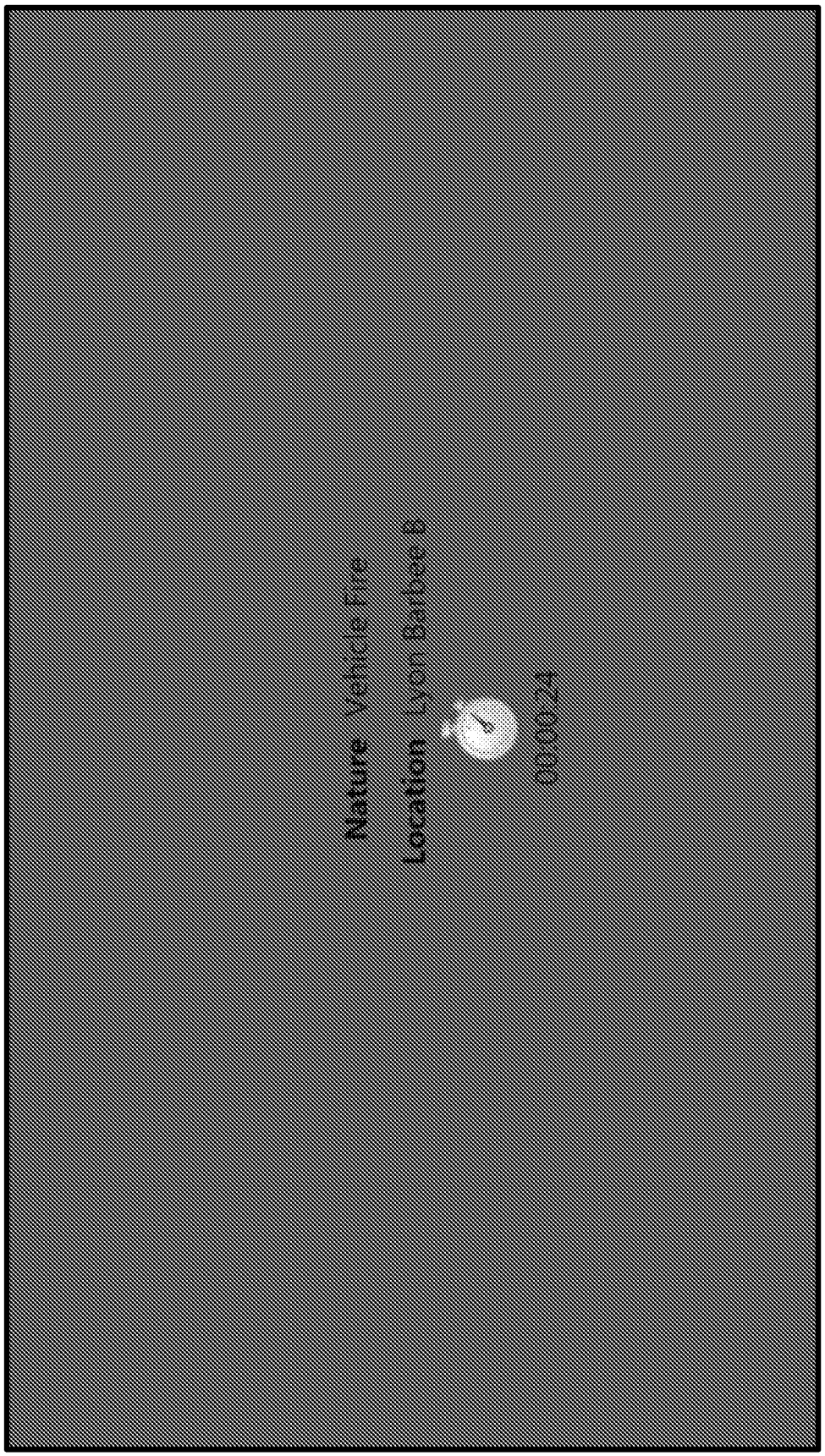
FIG. 5 illustrates an easy response button display screen, according to embodiments of the present invention.

FIG. 3 depicts a flow diagram 300 illustrating an activation of response status through use of an easy response button, according to embodiments of the present invention. First, a user logs in to the system by providing information about the individual and/or entering authentication or credential information (block 302). At the login screen, the user may input, select, or otherwise specify information such as specific company, username, and/or password, according to embodiments of the present invention. The user may be viewing any screen of the navigation device 110 (block 304), and when an incident is assigned to the particular vehicle or crew with which navigation device 110 is associated (block 306), the entire screen of the display device screen of navigation device 110 may be turned into an easy response button, which is illustrated in FIG. 5. The easy response button screen of FIG. 5 may list the nature of the assigned incident (e.g. "Vehicle Fire") and/or the location of the incident (e.g. "Lyon Barbee B" or "Main Street Café") and/or a time that has elapsed since the incident was assigned to the particular crew.

As used herein, the word "screen" is used in some instances to refer to the physical display device capable of displaying images, for example the display device incorporated with navigation system 110 (e.g. "device screen"), and in other instances to refer to the image, for example the particular pattern of colors, buttons, text, arrangement, and/or other visual appearance, displayed on the device screen (e.g. "display screen"). For example, FIGS. 5 through 25 illustrate display screens, while device 110 of FIG. 1 shows a device screen.

The screen of navigation device 110 may be a touch screen device or a device with similar operational characteristics, to permit tactile gestures to be used to indicate selections on the screen. By touching or tapping anywhere on the screen of FIG. 5, the user activates the easy response button (block 308), after which the status of the particular vehicle or crew is set to "en route" or the like (block 310), and the display screen is changed to the easy response screen illustrated in FIG. 12. Although a particular workflow for an incident assignment is described, other workflows may be achieved with navigation device 110.

Figure 4:
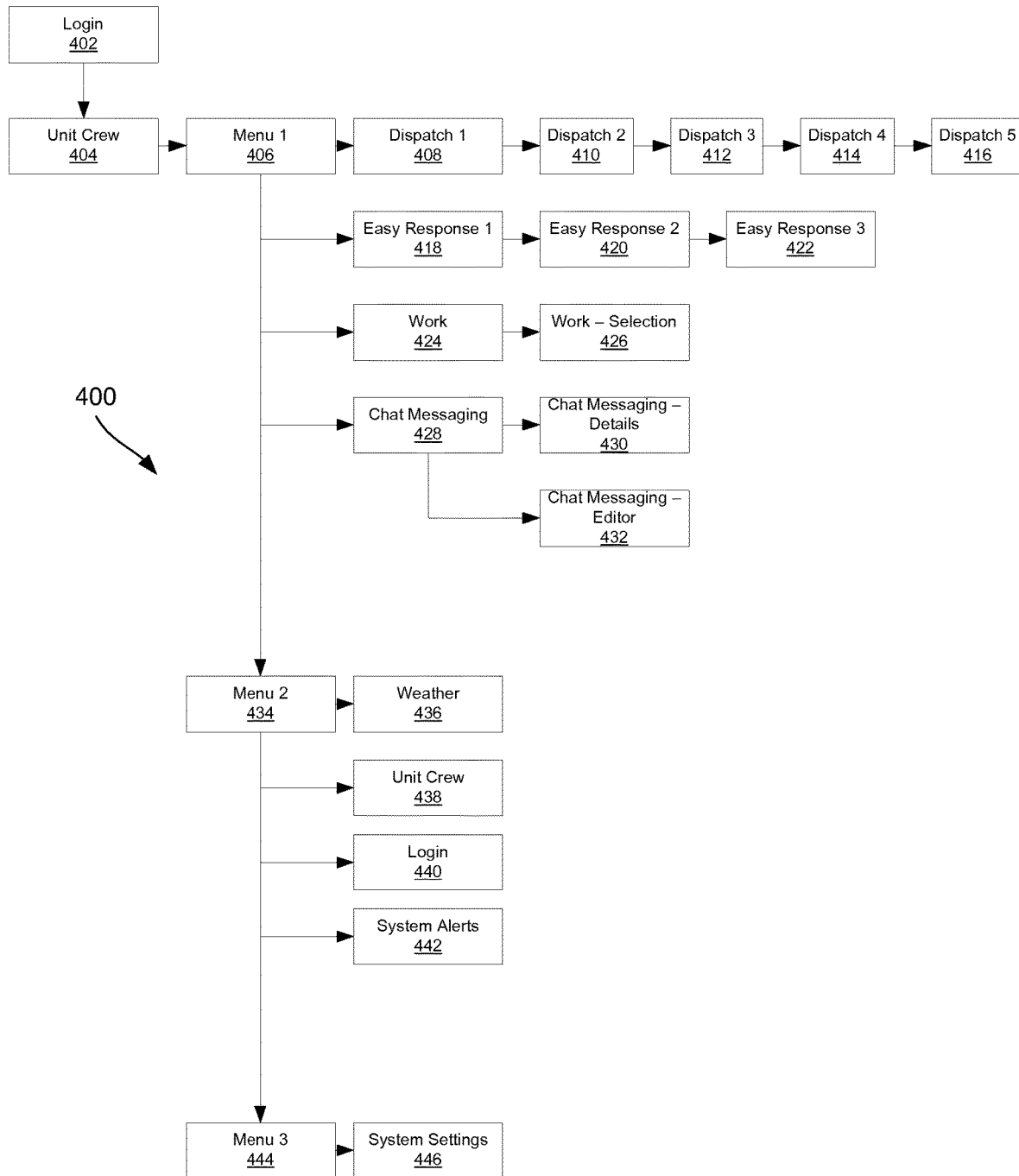
FIG. 4 illustrates a navigational linking relationship between display screens of an EMS navigation device, according to embodiments of the present invention.
Figure 22:
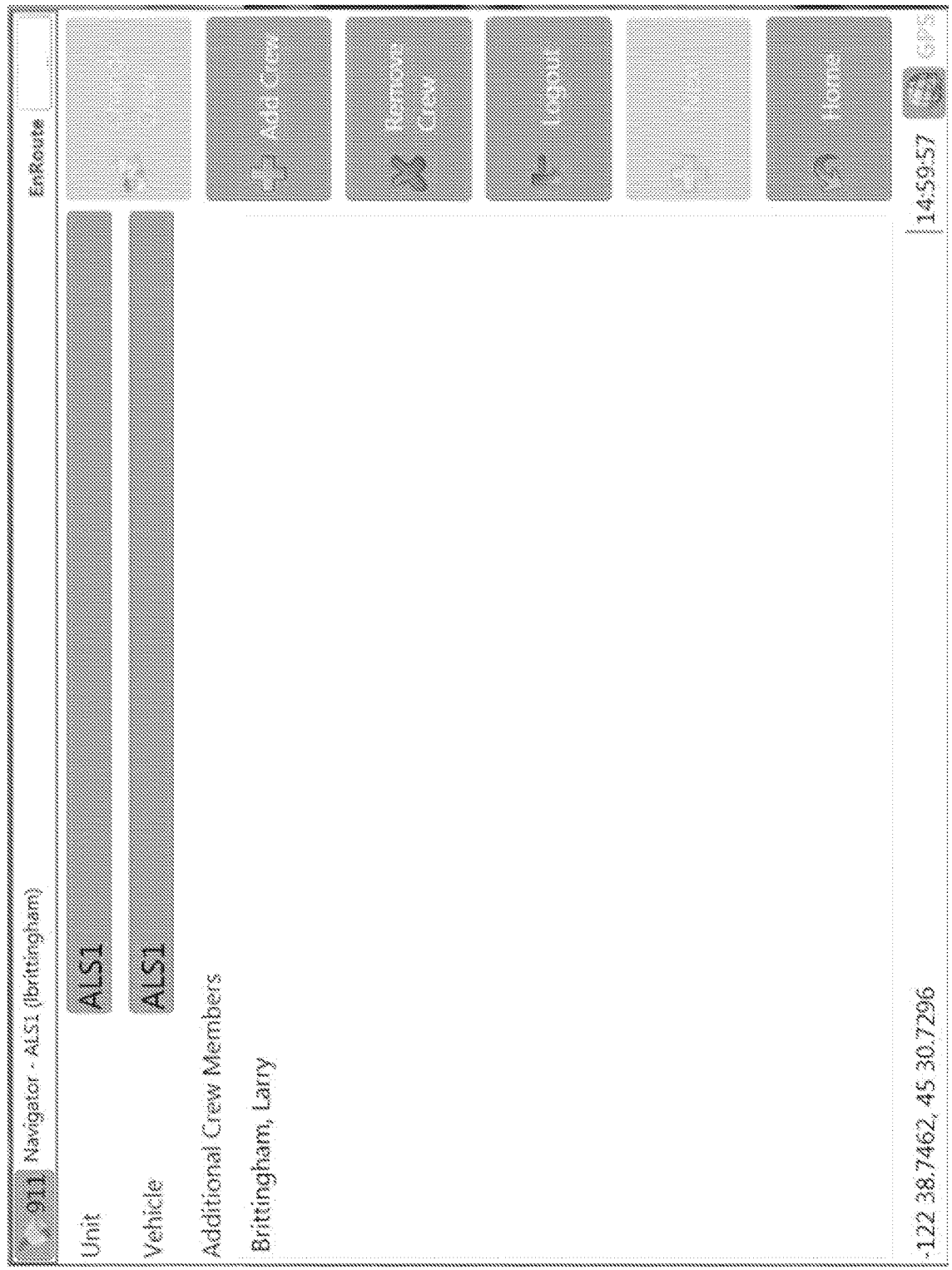
FIG. 22 illustrates a unit crew screen of an EMS navigation system, according to embodiments of the present invention.
Figure 23:
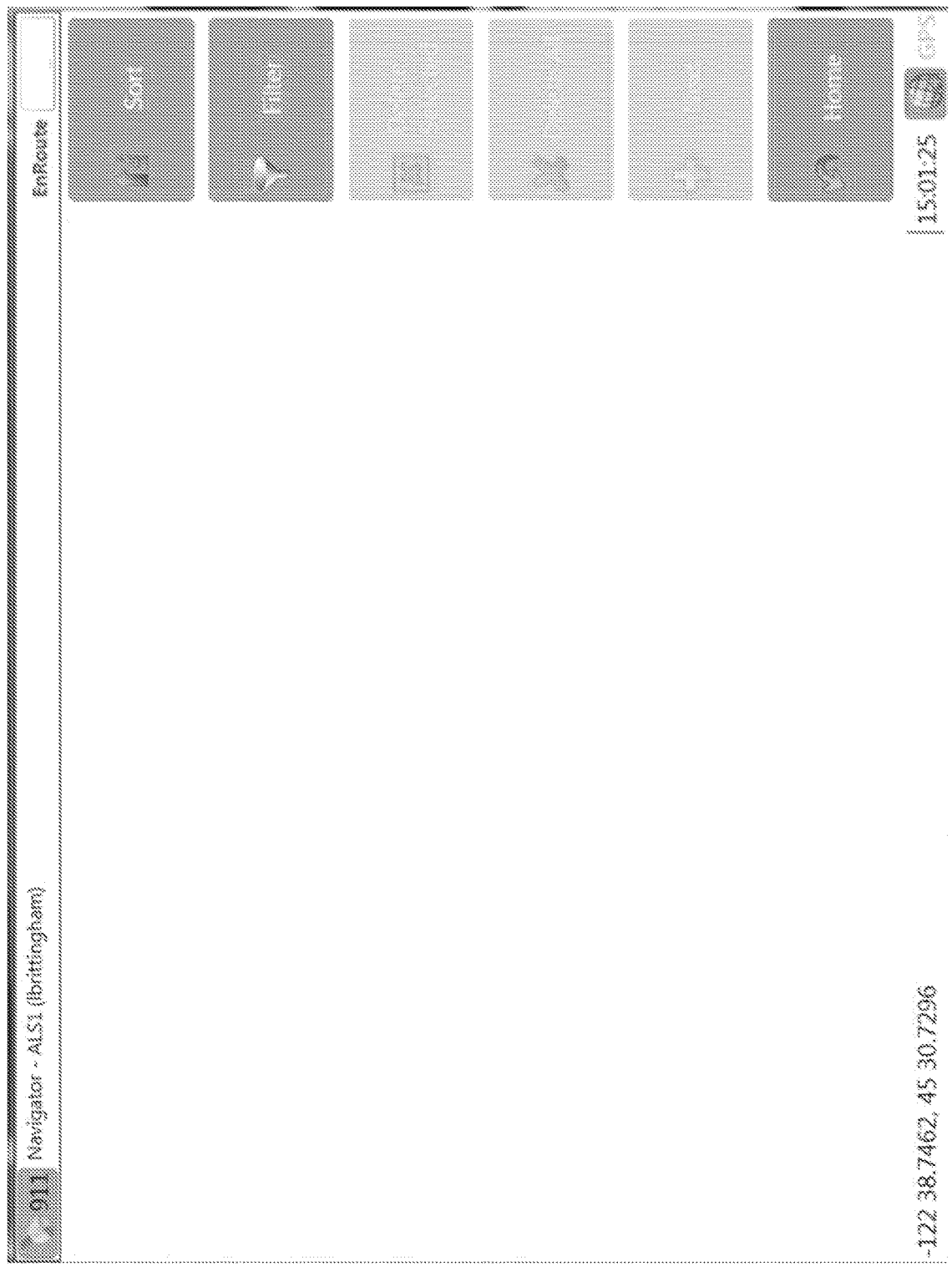
FIG. 23 illustrates a system alerts screen of an EMS navigation system, according to embodiments of the present invention.

FIG. 4 illustrates a navigational linking relationship map 400 between display screens of an EMS navigation device 110, according to embodiments of the present invention. At login screen 402, a user logs in to the system by providing information about the individual and/or entering authentication or credential information. At the login screen 402, the user may input, select, or otherwise specify information such as specific company, username, and/or password, according to embodiments of the present invention. At the unit crew screen 404, an example of which is illustrated at FIG. 22, the user may specify the vehicle, unit, and/or additional crew members for the unit for which the navigation system 110 will receive incident assignments and messages, according to embodiments of the present invention.

Figure 6:
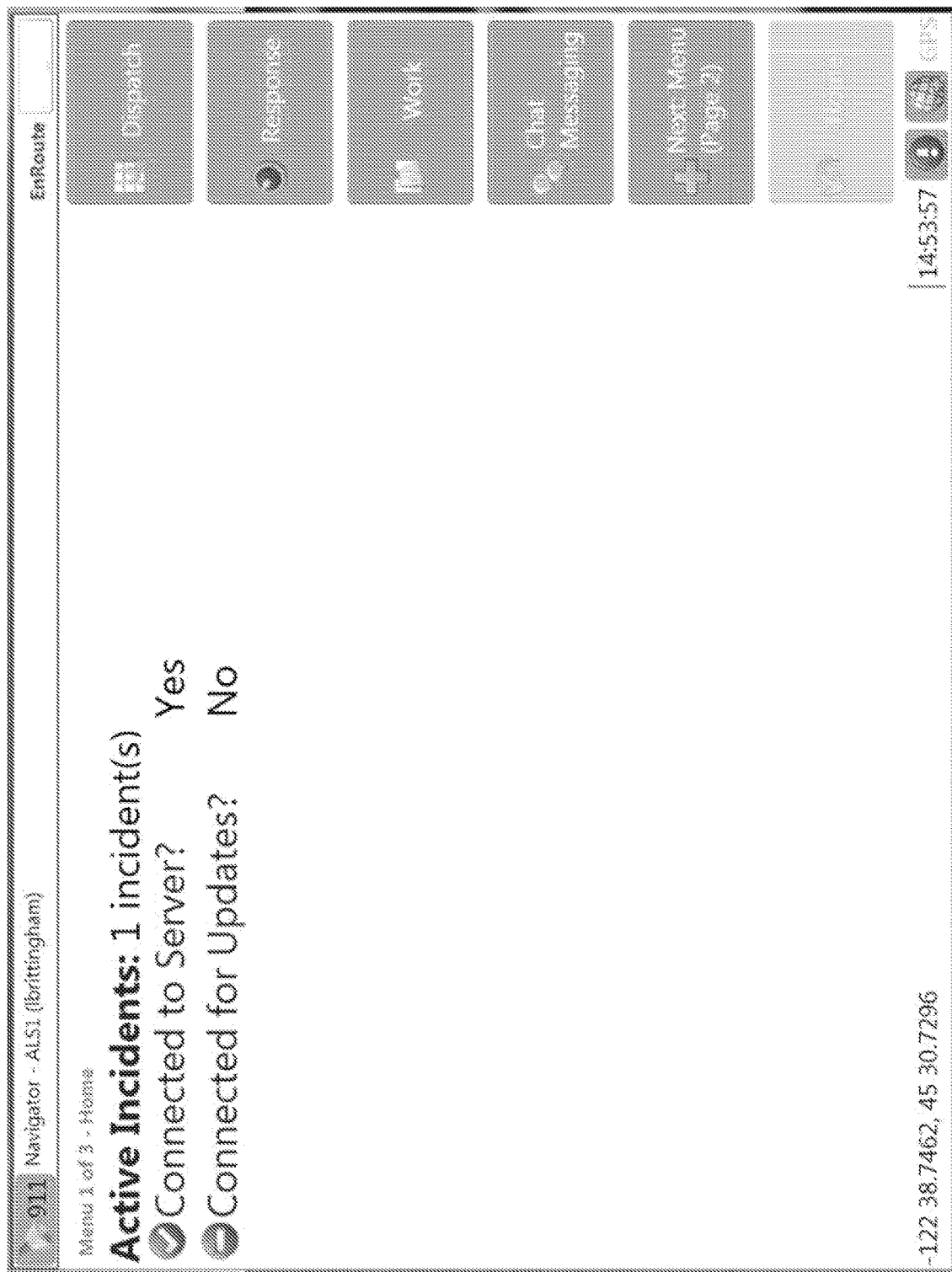
FIG. 6 illustrates a home screen of an EMS navigation system, according to embodiments of the present invention.
Figure 9:
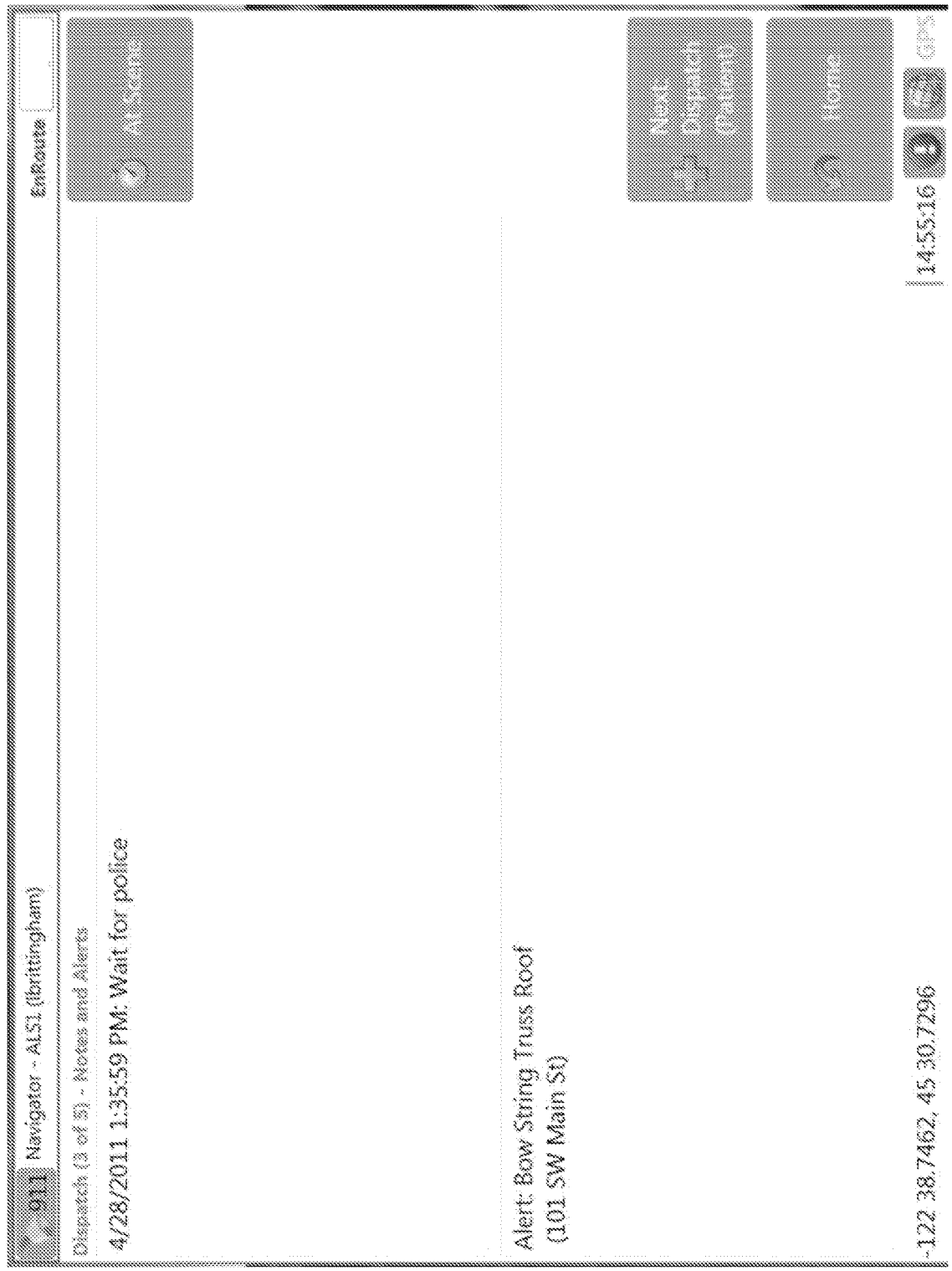
FIG. 9 illustrates a third dispatch screen of an EMS navigation system, according to embodiments of the present invention.
Figure 10:
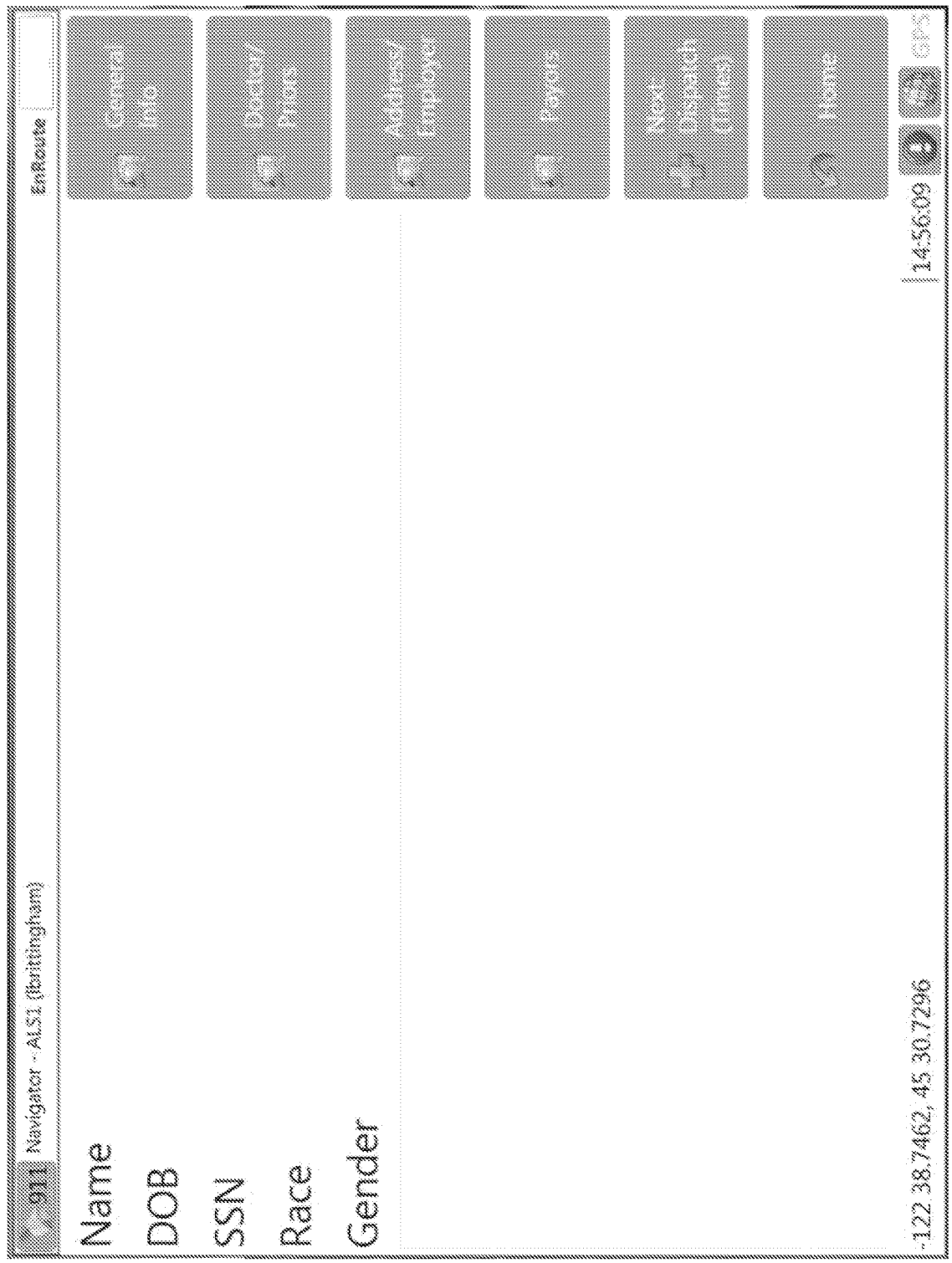
FIG. 10 illustrates a fourth dispatch screen of an EMS navigation system, according to embodiments of the present invention.
Figure 11:
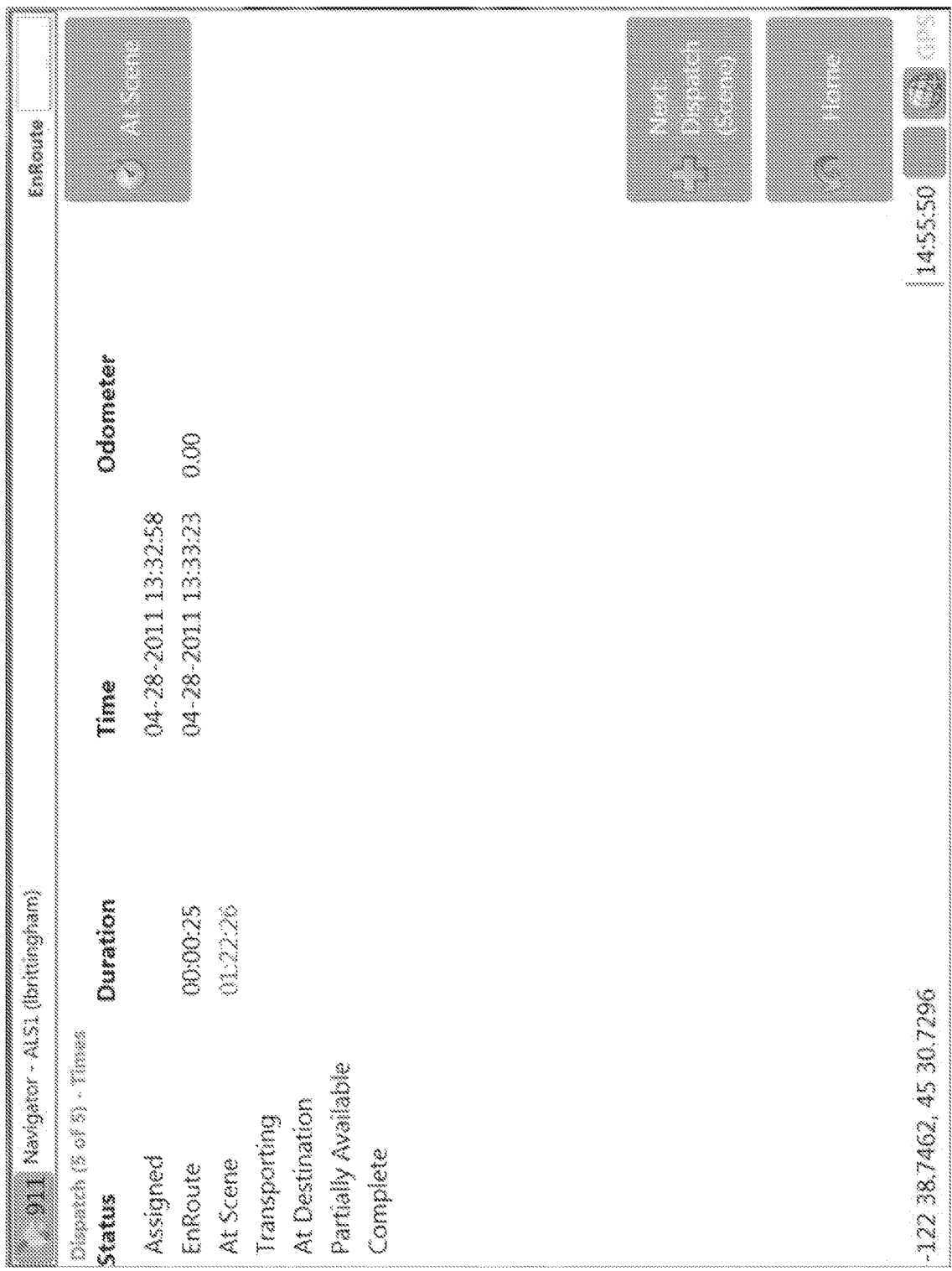
FIG. 11 illustrates a fifth dispatch screen of an EMS navigation system, according to embodiments of the present invention.

At the first menu screen 406, which is illustrated at FIG. 6, a user may select additional screens and/or functionality to view. For example, a user may select the Dispatch button to view the dispatch screen(s) of FIGS. 7 to 11, the Response button to view the easy response screen(s) of FIGS. 12 to 14, the Work button to view the work screen(s) of FIGS. 15 and 16, and the Chat Messaging button to view the chat messaging screen(s) of FIGS. 17 to 19. Clicking on the Next: Menu (Page 2) button will take the user to the second menu screen of FIG. 20.

Figure 7:
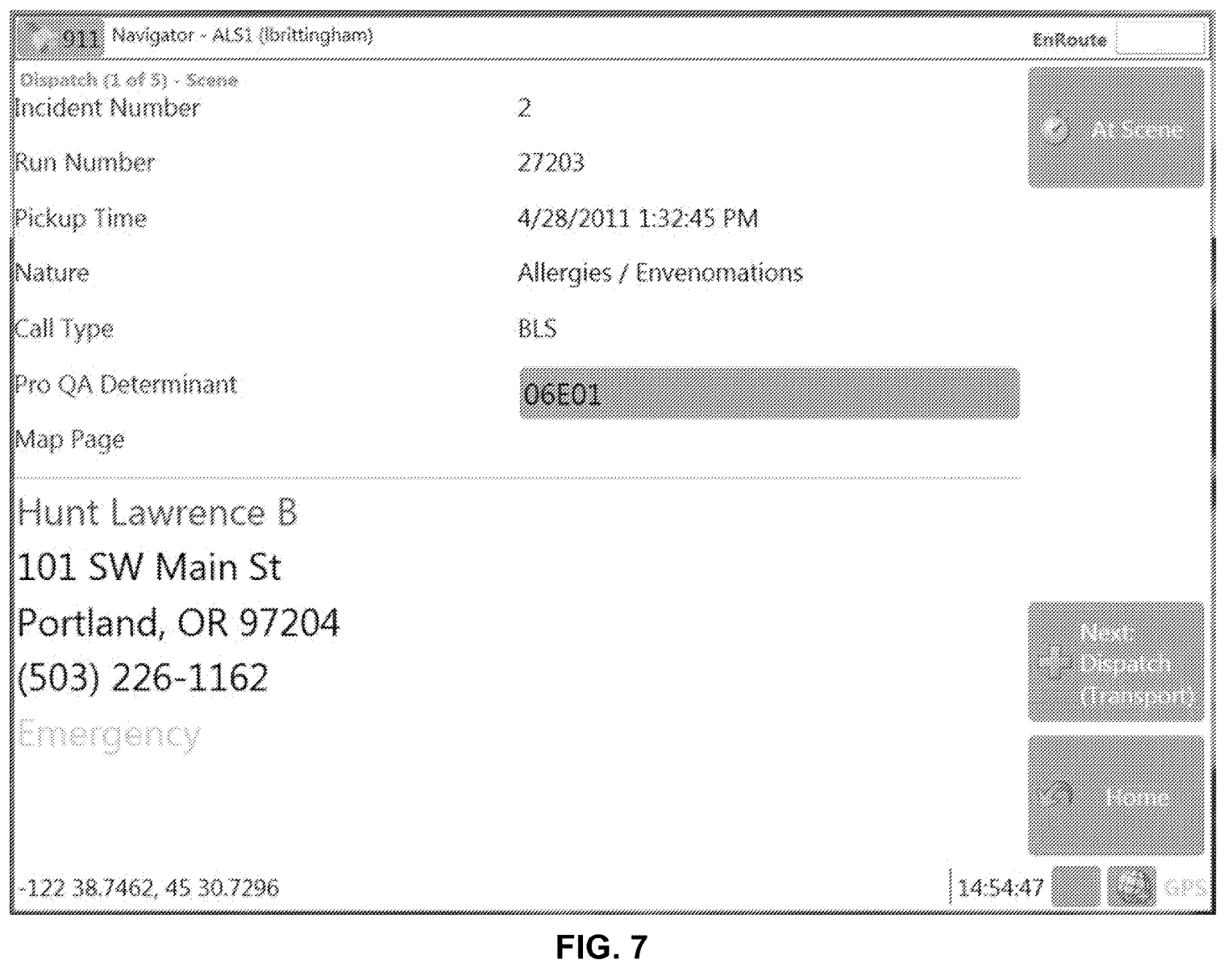
Figure 8:
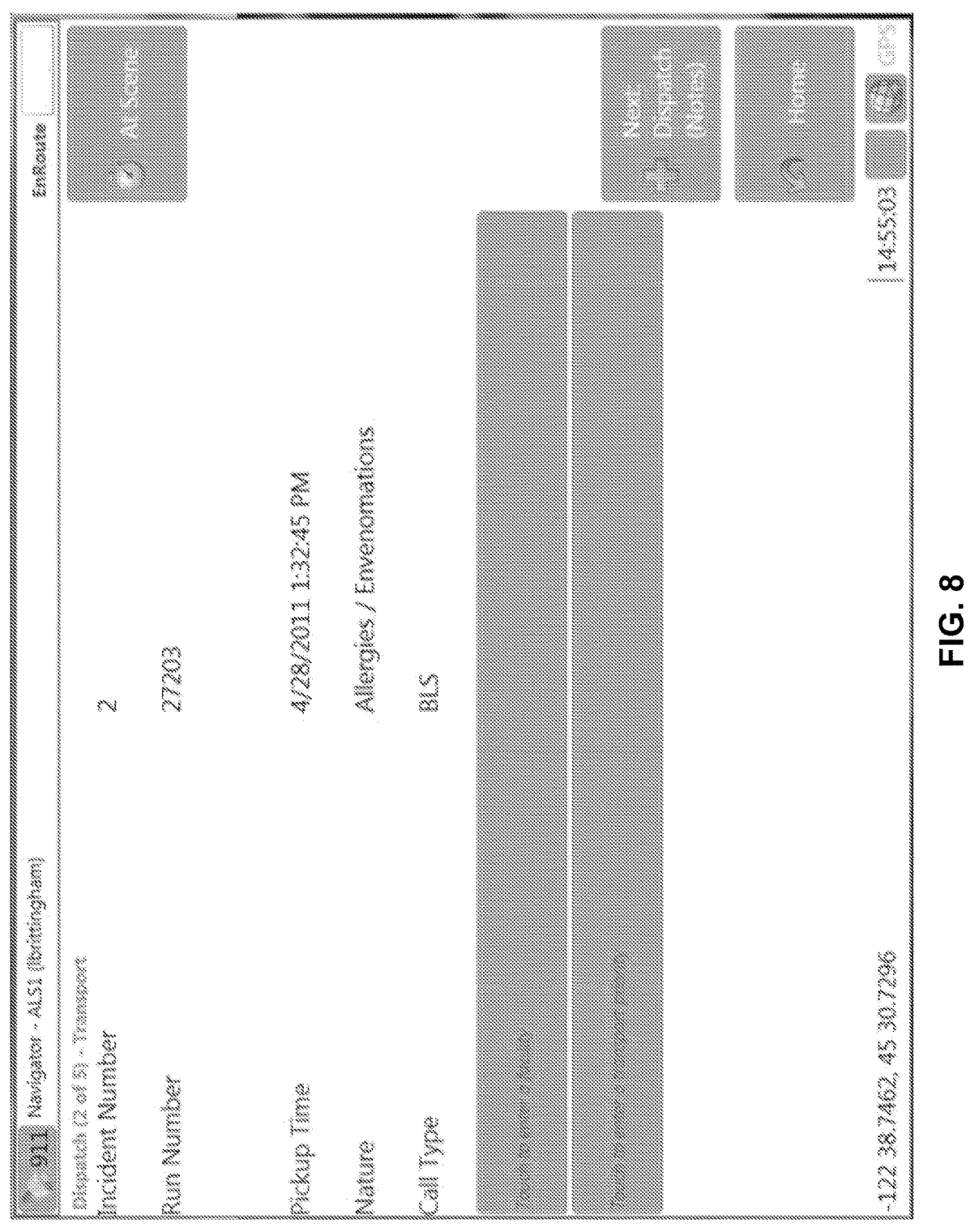

Clicking on the Dispatch button from the home screen 406 takes the user to the first dispatch screen 408, illustrated in FIG. 7. The screen of FIG. 7 displays information about incident identifiers and type, and/or the location for the incident, for example the incident to which the ambulance is responding. From this screen 408, clicking on the "Next Dispatch" button takes the user to the second dispatch screen 410, illustrated at FIG. 8, which also displays information about the incident identifiers and type, and/or the transport location for the incident. Clicking on the Next Dispatch button from screen 410 navigationally links the user to a third dispatch screen 412, illustrated in FIG. 9, which displays notes and alerts for the incident. The notes may include any entries added by dispatch throughout the lifecycle of the particular incident, according to embodiments of the present invention. Clicking on the Next Dispatch button from screen 412 navigationally links the user to a fourth dispatch screen 414, illustrated in FIG. 10, which displays patient information for the patient associated with the incident. This may include patient characteristics, referring doctor, prior incidents, home address, employer information, and/or payor information, according to embodiments of the present invention. Clicking on the Next Dispatch button from screen 414 takes the user to a fifth dispatch screen 416, illustrated in FIG. 11, which displays all time stamps entered for the incident, and/or duration on each unit status for the incident, according to embodiments of the present invention.

Figure 12:
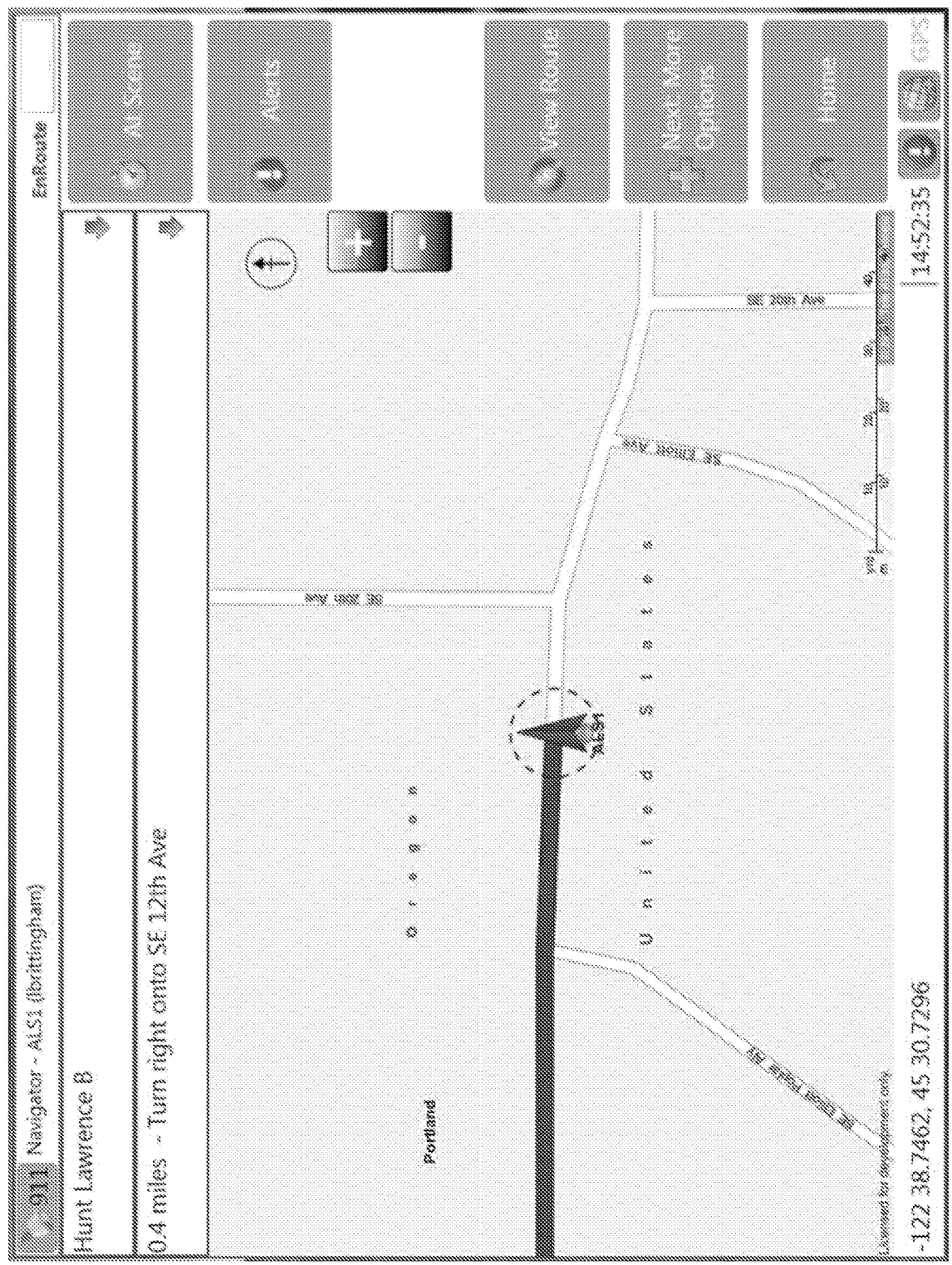
FIG. 12 illustrates a first easy response screen of an EMS navigation system, according to embodiments of the present invention.
Figure 13:
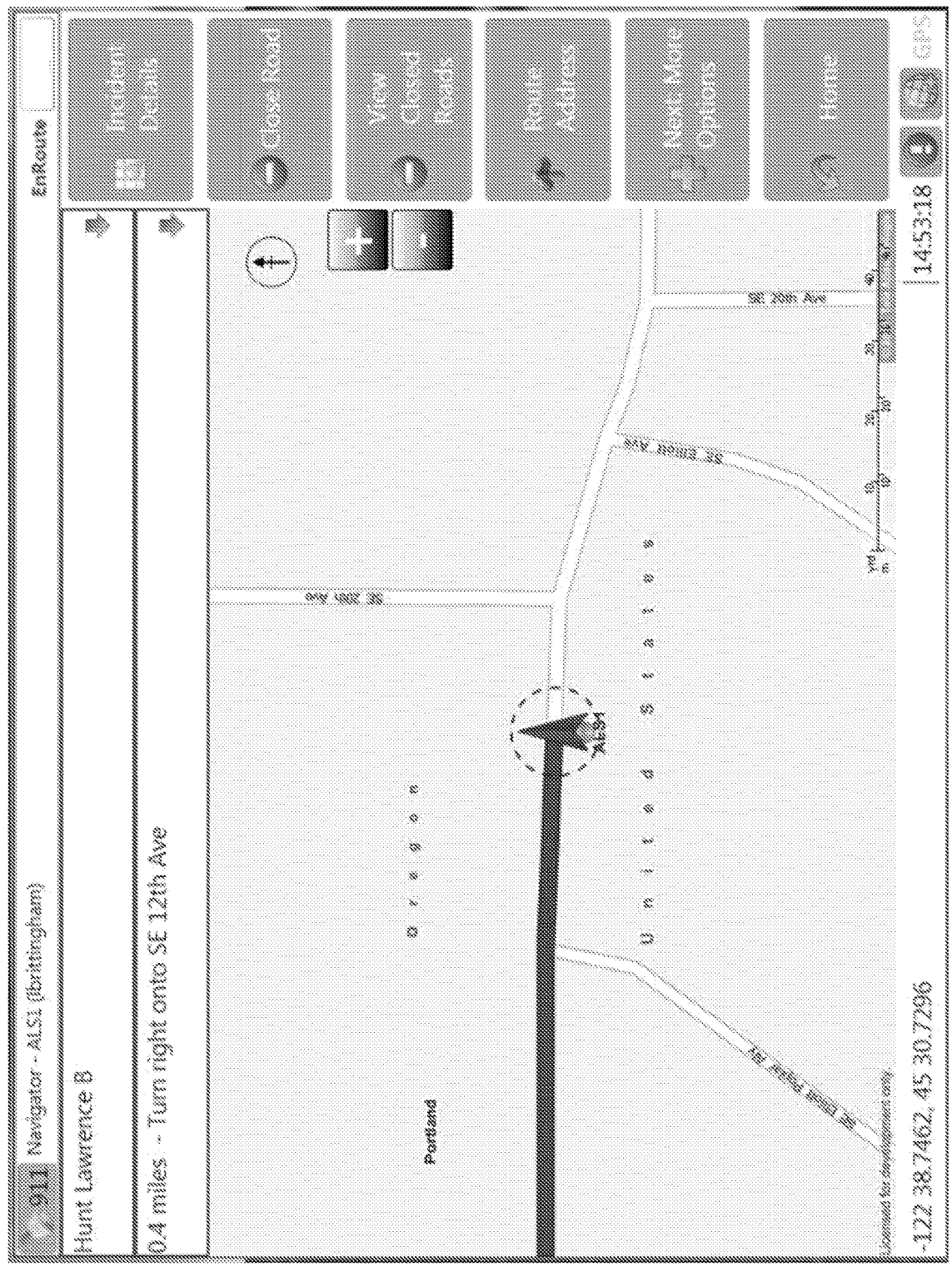
FIG. 13 illustrates a second easy response screen of an EMS navigation system, according to embodiments of the present invention.
Figure 14:
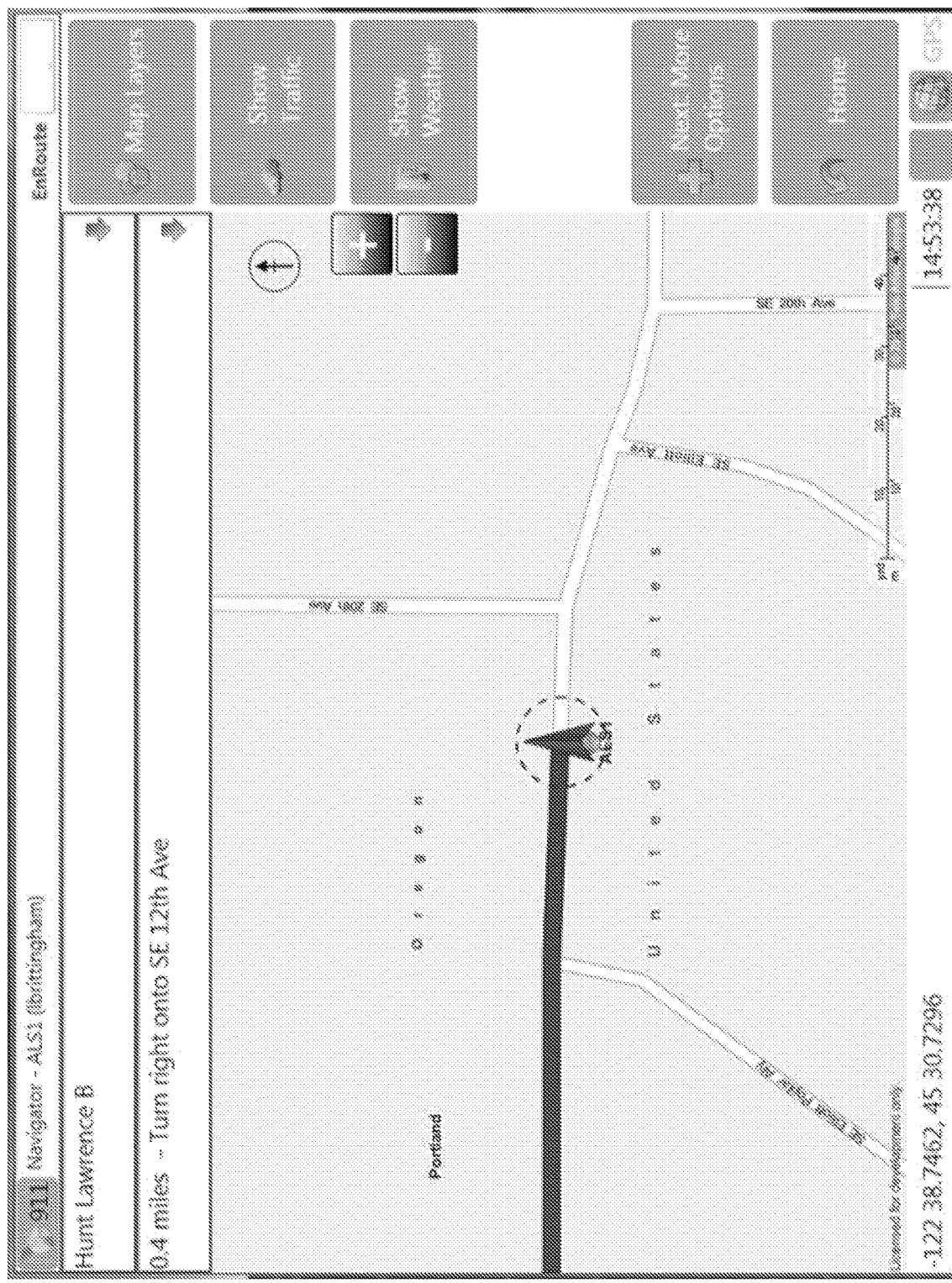
FIG. 14 illustrates a third easy response screen of an EMS navigation system, according to embodiments of the present invention.

From the home menu 406, selecting the Response button takes the user to easy response screen 418, which is illustrated at FIG. 12. Screen 418 displays a map with a route to the target destination, including address and directions. This screen 418 allows for setting time stamps for the incident, viewing alerts, viewing notes, and/or toggling the map view (for example between zooming to the destination location, viewing the entire route, and following the vehicle on the map), according to embodiments of the present invention. According to some embodiments of the present invention, the toggle button used to toggle between views is in the same location with respect to the display screen device in each of the two or three or more views, to facilitate easy and rapid toggling and/or cycling between the various kinds of views, without having to locate and select a different button for each view. Selecting the Next button from screen 418 takes the user to a second easy response screen 420, as illustrated in FIG. 13, which displays a second set of commands available on the easy response screen. These additional commands include switching to the dispatch screen 408 to view the incident details (Incident Details button), closing a road on the map, viewing a list of road closures, and/or routing to a custom address, according to embodiments of the present invention. Selecting the Next button from screen 420 takes the user to a third easy response screen 422, illustrated at FIG. 14, which displays a third set of commands including specifying which map layers to display on the map (Map Layers button), toggling traffic overlay on the map (Show Traffic button), and toggling weather overlay on the map (Show Weather button), according to embodiments of the present invention.

Figure 15:
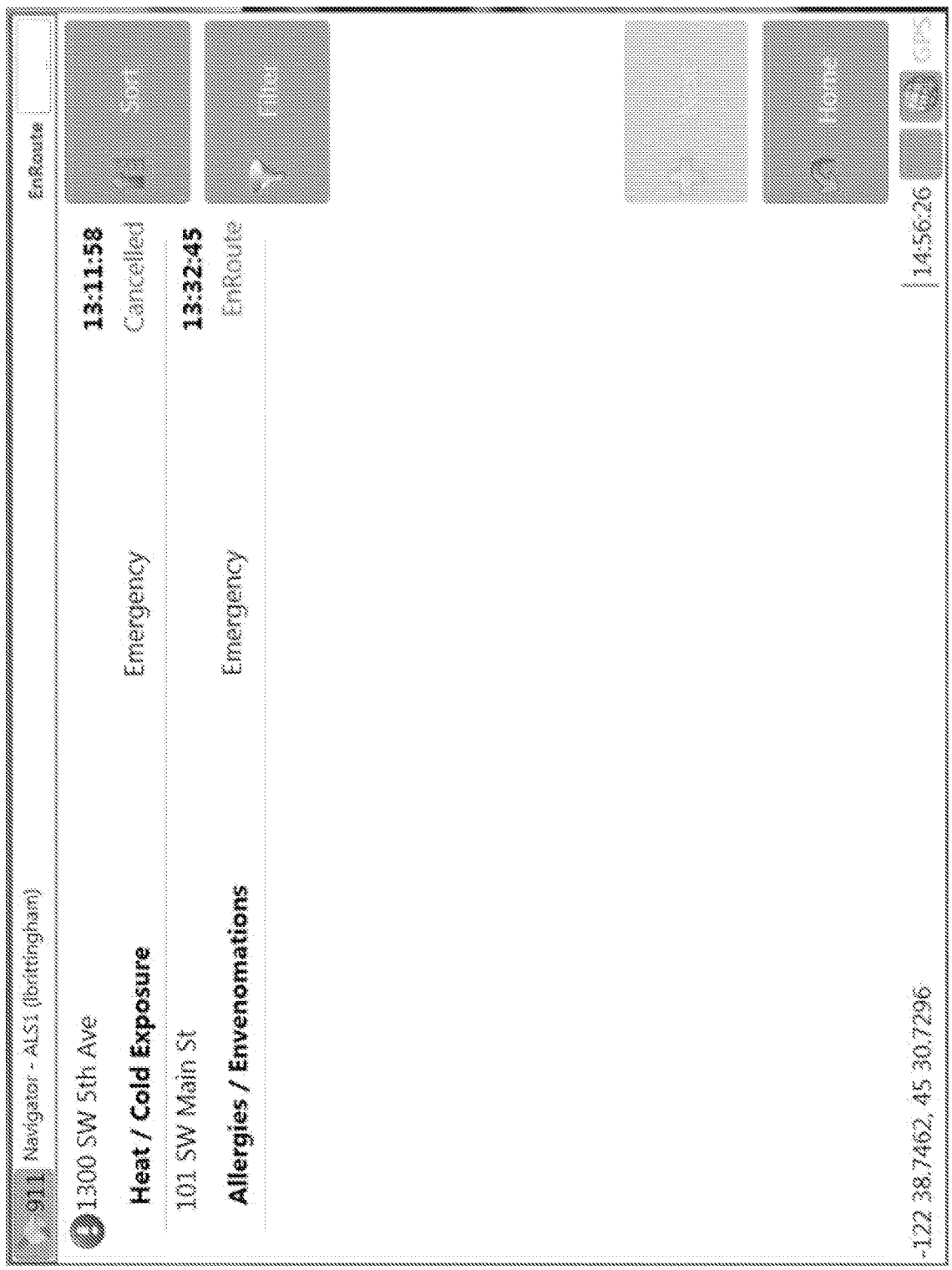
FIG. 15 illustrates a work screen of an EMS navigation system, according to embodiments of the present invention.

From the home menu 406, selecting the Work button takes the user to work screen 424, illustrated at FIG. 15, which displays a set of incidents that have been assigned to the unit throughout the shift, including open and completed incidents, according to embodiments of the present invention.

Selecting a particular item from the incidents listed on screen 424 takes the user to work selection screen 426, illustrated at FIG. 16, which shows a summary of the selected incident in the content area, and allows the user to navigate to the dispatch screen 408 (View Full Details button) to view the full incident details, or to the easy response screen 418 (Route to Scene button) showing a route between the unit and the incident location, according to embodiments of the present invention.

Figure 17:
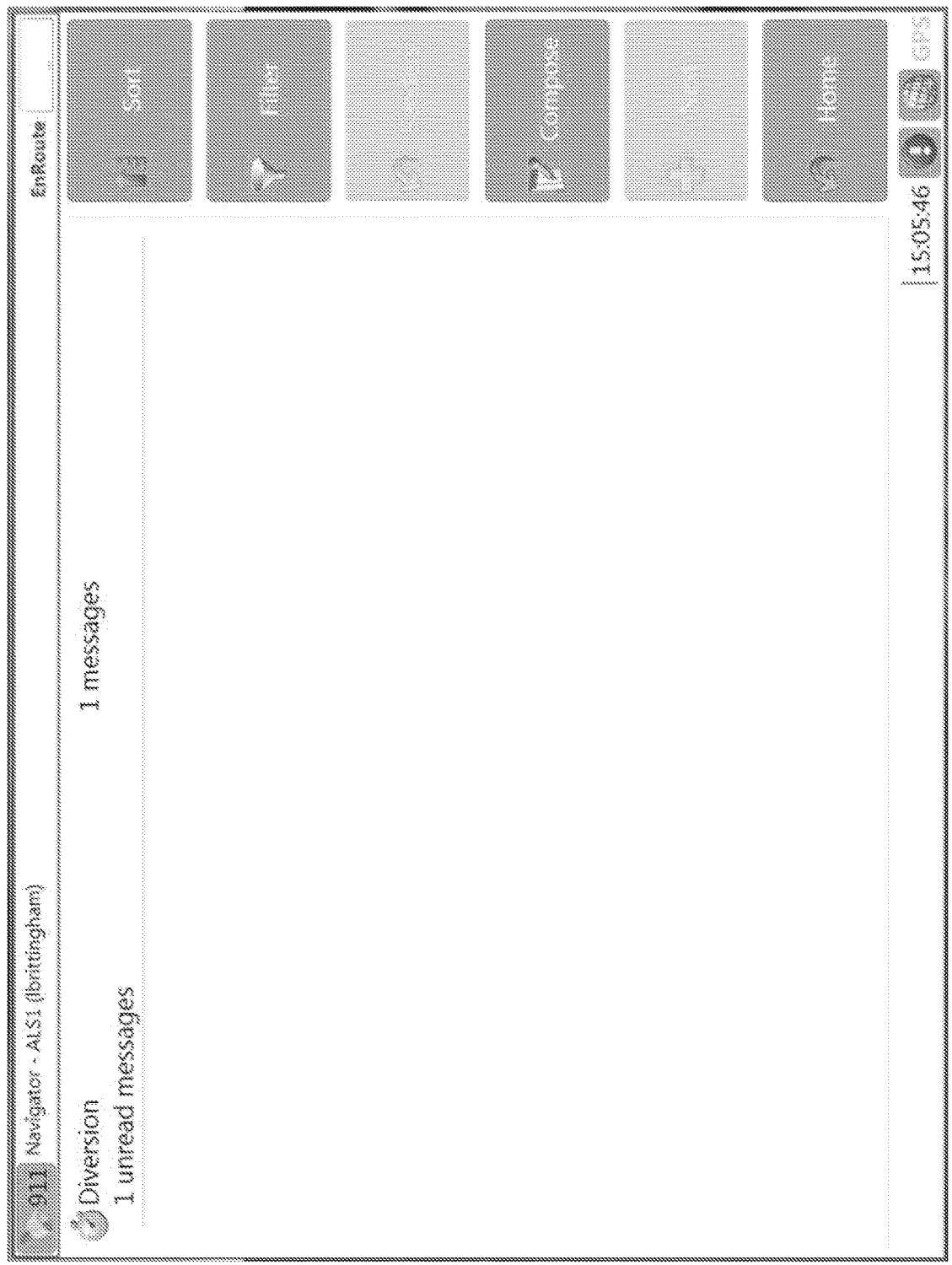
FIG. 17 illustrates a chat messaging screen of an EMS navigation system, according to embodiments of the present invention.
Figure 18:
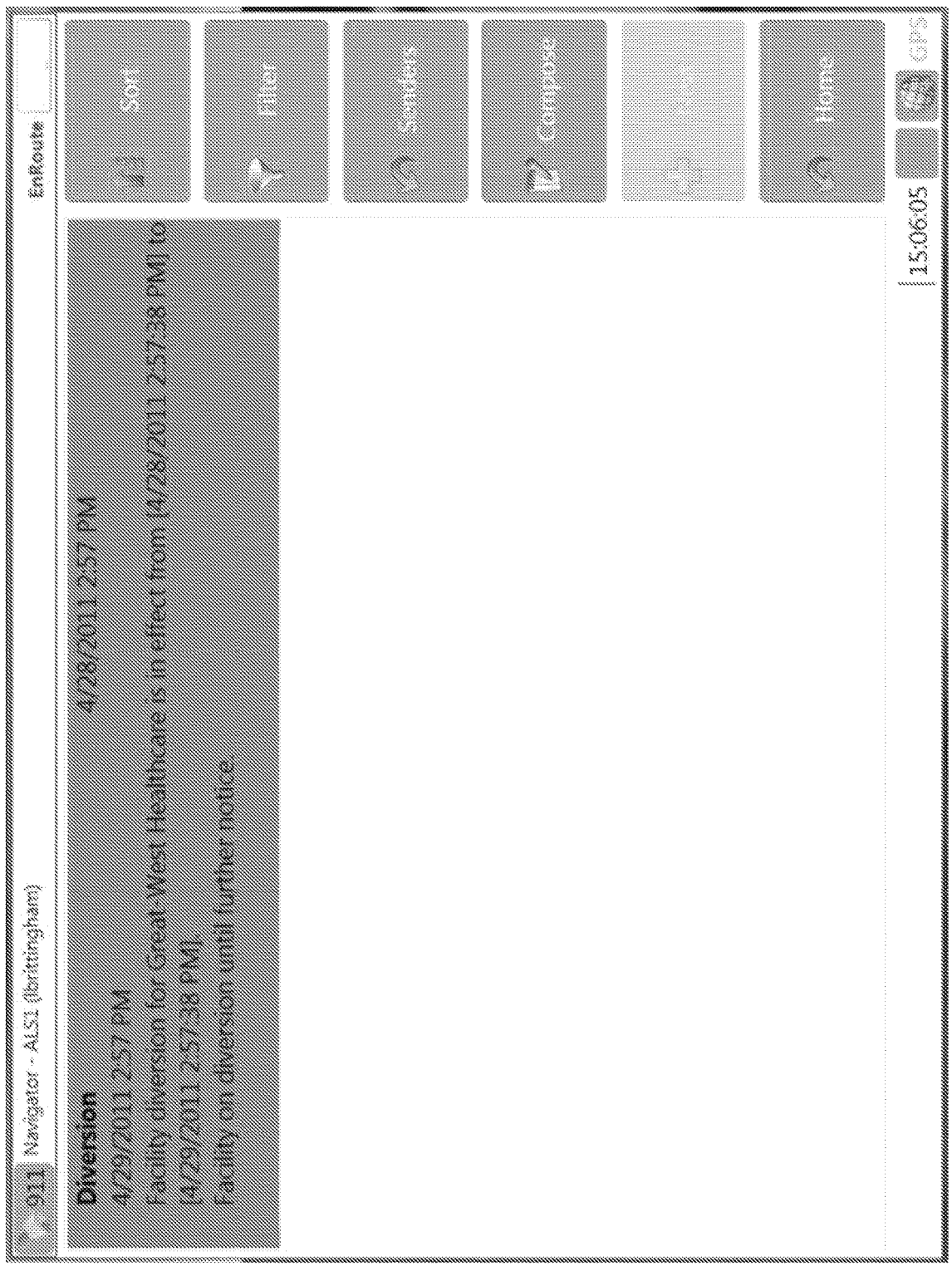
FIG. 18 illustrates a chat messaging details screen of an EMS navigation system, according to embodiments of the present invention.
Figure 19:
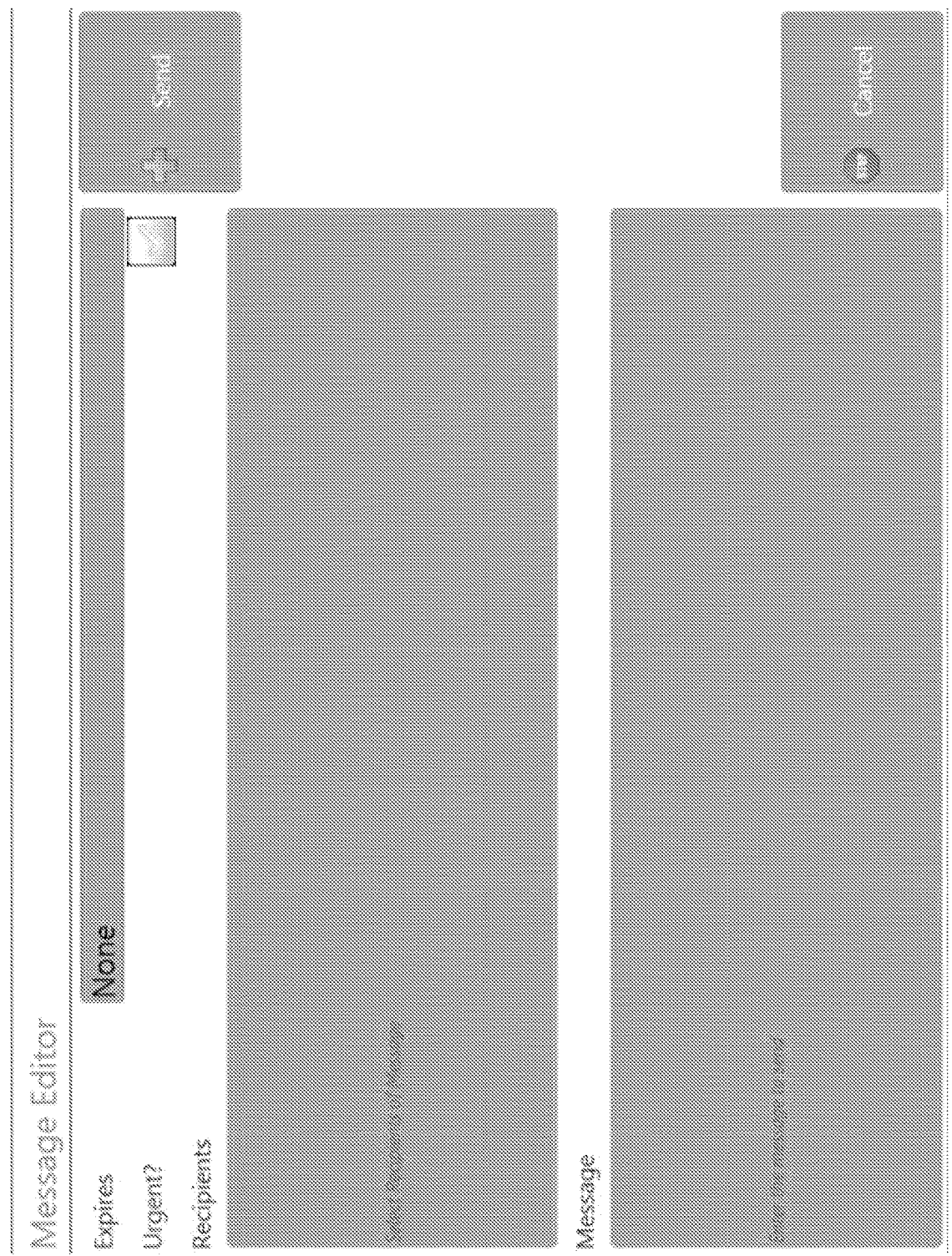
FIG. 19 illustrates a chat messaging editor screen of an EMS navigation system, according to embodiments of the present invention.

From the home menu 406, selecting the Chat Messaging button takes the user to the chat messaging screen 428, illustrated at FIG. 17, which displays a list of facility diversions and textual messages sent to and/or from other units and/or dispatch, according to embodiments of the present invention. From screen 428, selecting a particular message from the list (e.g. by tapping or clicking on it) takes the user to a chat messaging details screen 430, illustrated at FIG. 18, which displays the details for a chat message including when the message was sent, the sender of the message, the full message text, and/or when the message expires (at which time it may be removed from the message list, for example). Selecting the Compose button from screen 428 takes the user to the chat messaging editor screen 432, illustrated at FIG. 19, which displays an editor interface for composing a chat message to send, according to embodiments of the present invention.

Figure 20:
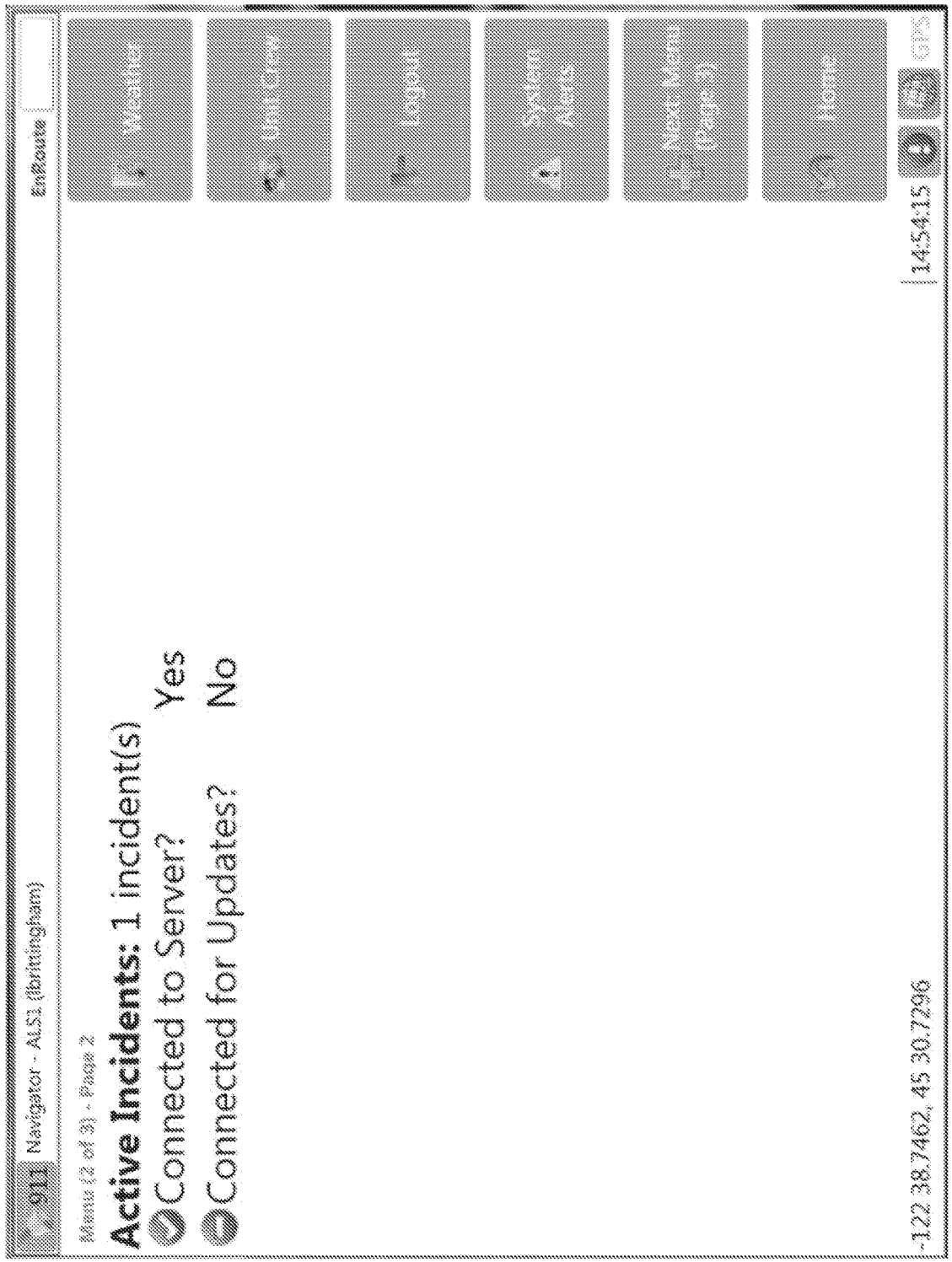
FIG. 20 illustrates a second menu screen of an EMS navigation system, according to embodiments of the present invention.
Figure 21:
FIG. 21 illustrates a weather screen of an EMS navigation system, according to embodiments of the present invention.

From the home menu 406, selecting the Next:Menu button takes the user to the second menu screen 434, which is illustrated at FIG. 20. Pushing the Weather button from screen 434 takes the user to the weather screen 436, illustrated at FIG. 21, which displays the current weather conditions and/or projected weather conditions for a particular time period or throughout the day, according to embodiments of the present invention. Pushing the Unit Crew button from screen 434 takes the user to the unit crew screen 438 illustrated at FIG. 22, which permits the user to change the vehicle, unit, and additional crew members for the user who is logged in to the system, according to embodiments of the present invention. Pushing the Logout button from screen 434 logs out the current user and takes the user to the login screen. Selecting the System Alerts button from screen 434 takes the user to the system alerts screen 442, illustrated at FIG. 23, which displays any system errors that have occurred, for example when the user-entered time stamp for an incident was rejected because it was already set by dispatch, according to embodiments of the present invention.

Figure 24:
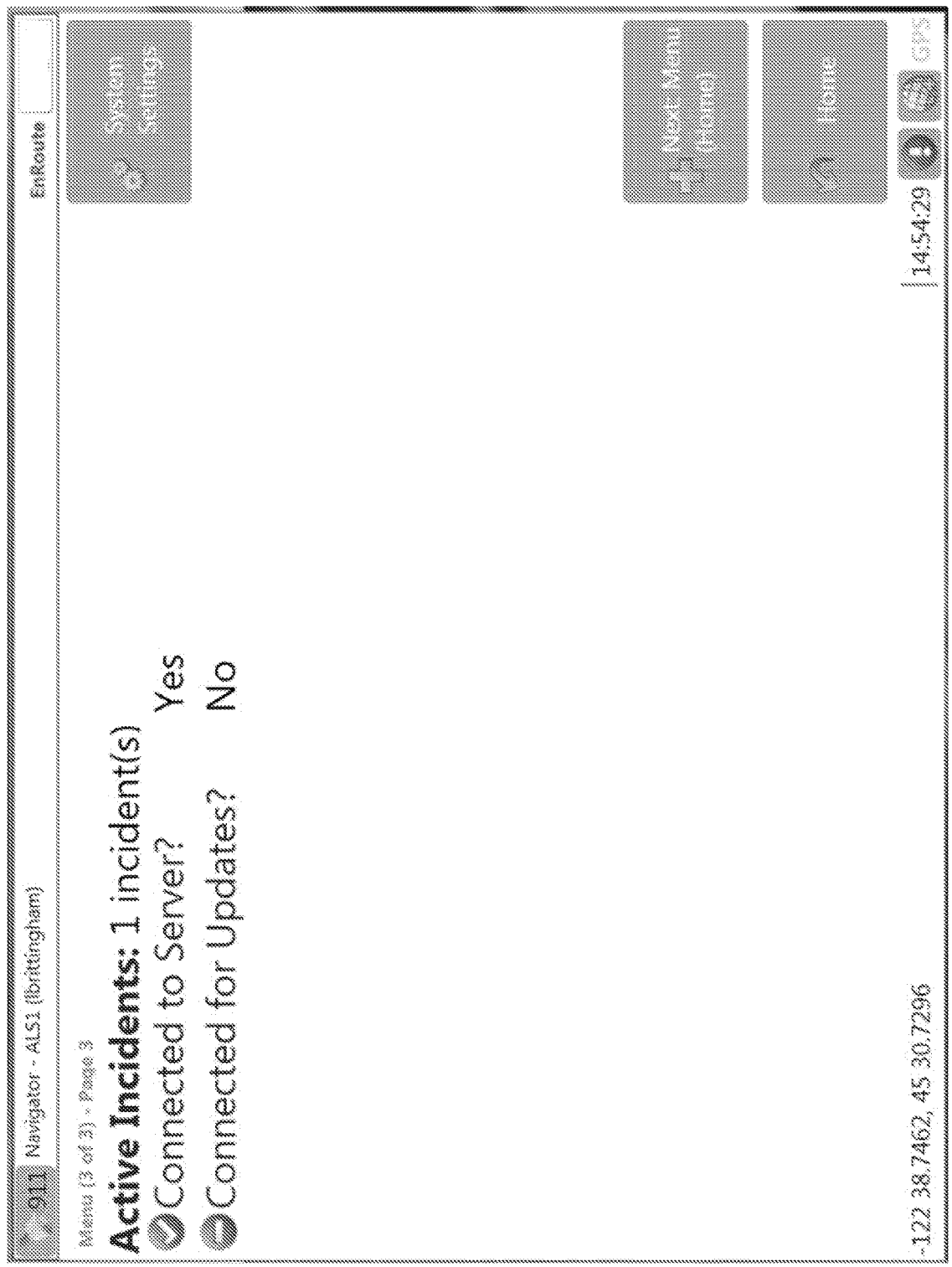
FIG. 24 illustrates a third menu screen of an EMS navigation system, according to embodiments of the present invention.
Figure 25:
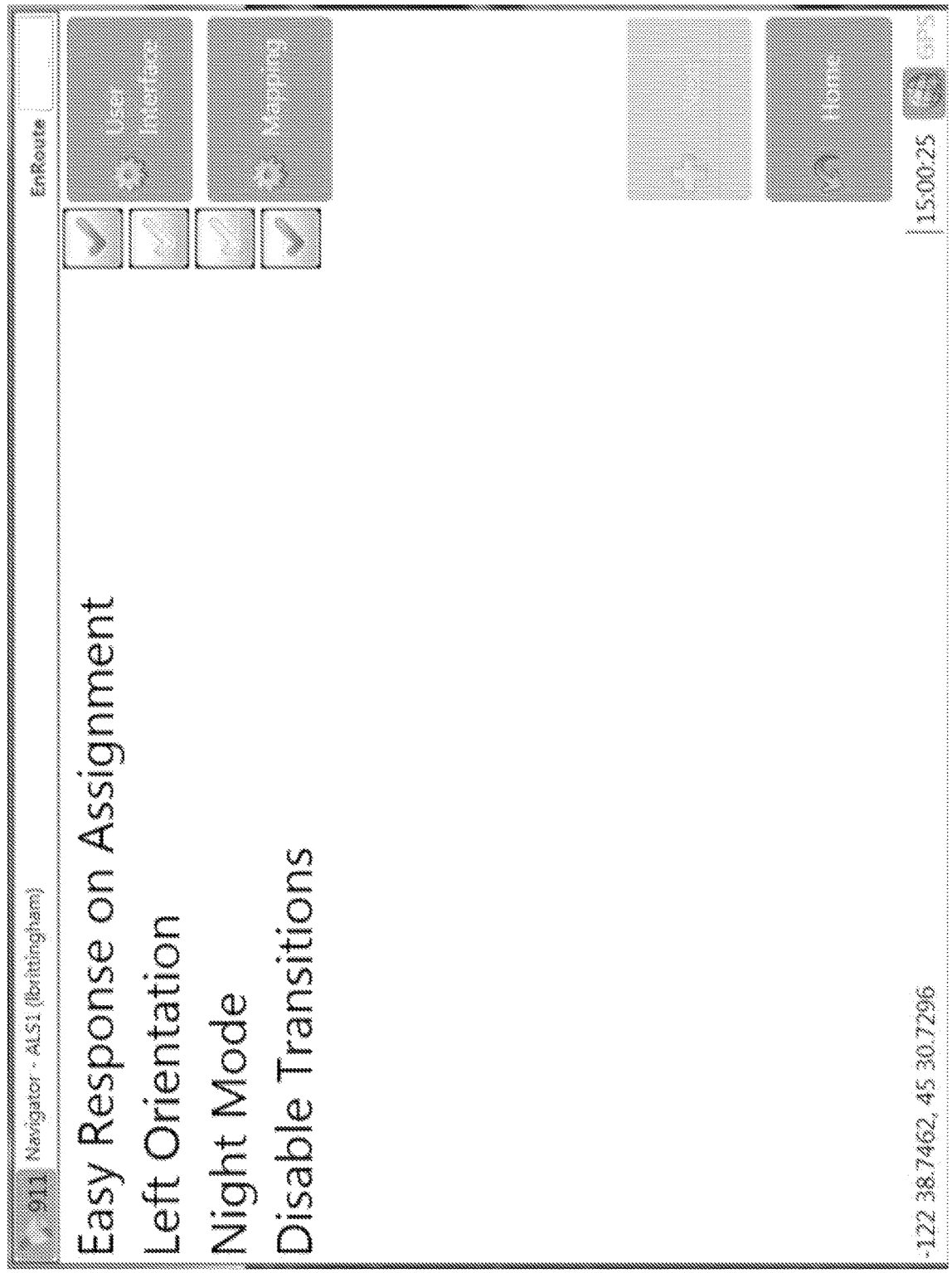
FIG. 25 illustrates a system settings screen of an EMS navigation system, according to embodiments of the present invention.

From the second menu screen 434, selecting the Next:Menu button takes the user to the third menu screen 444, as illustrated at FIG. 24, according to embodiments of the present invention. Selecting the Next:Menu button from screen 444 takes the user back to the home screen 406. Selecting the System Settings button from screen 444 takes the user to system settings screen 446, illustrated at FIG. 25, which allows the user to customize the features and behavior of the application. For example, when the "Easy Response on Assignment" checkbox is activated (e.g. by clicking on or tapping the checkbox), the user is taken immediately to the easy response screen 418 as soon as the easy response button (FIG. 5) is activated. The easy response button screen of FIG. 5 may be color coded to draw attention to the fact that a new incident assignment has been received; for example, the easy response button screen of FIG. 5 may be colored bright red or orange.

The display screens described above show the primary navigation buttons as being of substantially the same size, and/or oriented adjacent to the right side of the screen display device. Activating the "Left Orientation" checkbox in screen 446 switches the orientation and alignment of the primary navigation buttons from the right side to the left side of the screen. This may be done for left-handed users, for example.

Placing the primary navigation buttons against either the right or left sides of the display screen facilitates user of the interface by EMS users. This feature permits an EMS user to place one or more fingers onto the physical device containing the display screen, and use his or her thumb to select the primary navigation buttons, which are rather large (and may be larger than any other buttons on the screens, for example secondary buttons which are not often needed during an incident response). For example, when the navigation buttons are placed adjacent to the right side perimeter of the display screen, a user may place a hand on the side of the device, with the fingers behind the device and/or pointed away from the user, while the user uses the thumb of the hand to navigate the menu structure described with respect to FIG. 4, according to embodiments of the present invention. As such, the user can use the physical device as a reference point, without having to continually visually scan the display to find new button placements and/or to find smaller or more obscure buttons while navigating the screens or pages. The user knows that somewhere near the bottom right of the screen is the lowest button, and somewhere near the top right of the screen is the highest button. This same setup may be employed by placing the buttons along the left side of the screen. According to some embodiments, the buttons may be placed adjacent to either the top or the bottom edge of the screen, depending on the placement and orientation of the navigation device 110, and the particular user's preferences.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A system for tracking and management of emergency medical services (EMS) responses, the system comprising one or more servers configured to:
   during a shift of an EMS crew, assign at least an emergency non-prescheduled transport and a non-emergency pre-scheduled transport to one EMS vehicle of the EMS crew;
   provide a user interface comprising a map comprising location information for the EMS vehicle;
   receive location information updates for the EMS vehicle;
   for each assigned transport, update the map and a status indication for the EMS vehicle at the user interface based on the location information updates,
   wherein
      the status indication update, for one location information update of the location information updates, comprises a transporting indication corresponding to a transport of a patient in the EMS vehicle, and
      the map update comprises a transport destination for the patient in the EMS vehicle; and
   store a status history for the EMS vehicle.

2. The system of claim 1, wherein the one or more servers provide a client-server architecture.

3. The system of claim 1, comprising a mobile device associated with the EMS vehicle, wherein the mobile device is configured to display navigation information and incident information, wherein assigning each respective assigned transport comprises providing, for review at the mobile device, the incident information associated with the respective assigned transport.

4. The system of claim 3, wherein the mobile device provides user selectable controls corresponding to scene location information and destination location information.

5. The system of claim 3, wherein the mobile device is configured to provide, to at least one of the one or more servers, one or more of vehicle speed information, travel time, or an estimated time of arrival.

6. The system of claim 1, wherein the user interface comprises a chat messaging interface for chat messages between the EMS crew and a remote dispatch service.

7. The system of claim 6, wherein the chat messaging interface comprises a list of textual messages.

8. The system of claim 6, wherein the chat messaging interface displays at least one of a message time stamp, a sender identification, or a full text associated with a particular message.

9. The system of claim 6, wherein the chat messaging interface comprises a message editing screen configured to enable a user to compose a chat message.

10. The system of claim 1, wherein the location information comprises a name of an incident location.

11. The system of claim 1, wherein the location information comprises global positioning system (GPS) information.

12. The system of claim 1, wherein the EMS vehicle comprises an ambulance.

13. The system of claim 1, wherein the location information updates are real-time location information updates.

14. The system of claim 1, wherein the user interface comprises a dispatch screen.

15. The system of claim 1, wherein the status indication update for another information update of the location information updates comprises one of an assigned indication, an open indication, an en route indication, an at scene indication, a transporting indication, an at destination indication, a canceled indication, or a complete indication.

16. The system of claim 1, wherein the one or more servers are configured to populate the map with a visual representation of an entire route for the EMS vehicle, the entire route comprising an incident location and a destination for patient transport.

17. The system of claim 16, wherein the entire route includes routing to a custom address.

18. The system of claim 1, wherein the user interface is configured to provide one or more of incident details, dispatch notes, road closure information, or weather information.

19. The system of claim 18, wherein the dispatch notes comprise one or more of patient characteristics, physician information, prior incident information for the patient in the EMS vehicle, a patient home address, a patient employer, or payor information for the patient in the EMS vehicle.

20. The system of claim 1, wherein the one or more servers are configured to associate run numbers and determinant codes with each of respective assigned transport.

21. The system of claim 1, wherein the status indication comprises one or more time stamps associated with each respective assigned transport, wherein
the one or more time stamps indicate one or more response times for a crew assigned to the respective assigned transport.

* * * * *

UNITED STATES PATENT AND TRADEMARK OFFICE
CERTIFICATE OF CORRECTION

Page 1 of 1

PATENT NO. : 12,411,018 B2
APPLICATION NO. : 18/118408
DATED : September 9, 2025
INVENTOR(S) : Robert H. Gotschall, Michael S. Erlich and James S. McElroy, Jr.

It is certified that error appears in the above-identified patent and that said Letters Patent is hereby corrected as shown below:

In the Claims

In Claim 20, Column 12, Line 27, "of respective" should read --respective--.

Signed and Sealed this
Eleventh Day of November, 2025

John A. Squires
*Director of the United States Patent and Trademark Office*